US010916793B2

(12) United States Patent
Edmonston et al.

(10) Patent No.: US 10,916,793 B2
(45) Date of Patent: Feb. 9, 2021

(54) METHOD FOR JOINING A CERAMIC MATRIX COMPOSITE TO DENSE CERAMICS FOR IMPROVED JOINT STRENGTH

(71) Applicant: BLOOM ENERGY CORPORATION, Sunnyvale, CA (US)

(72) Inventors: David Edmonston, Soquel, CA (US); Michael Petrucha, Santa Clara, CA (US); Martin Perry, Mountain View, CA (US); Avinash Verma, Cupertino, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 52 days.

(21) Appl. No.: 16/126,202

(22) Filed: Sep. 10, 2018

(65) Prior Publication Data
US 2019/0109345 A1    Apr. 11, 2019

Related U.S. Application Data

(60) Provisional application No. 62/569,192, filed on Oct. 6, 2017.

(51) Int. Cl.
*H01M 8/2475*    (2016.01)
*H01M 8/0282*    (2016.01)

(52) U.S. Cl.
CPC ....... *H01M 8/2475* (2013.01); *H01M 8/0282* (2013.01)

(58) Field of Classification Search
CPC .................. H01M 8/2475; H01M 8/0282
See application file for complete search history.

(56) References Cited

U.S. PATENT DOCUMENTS

| 4,824,742 | A | * | 4/1989 | Parry | ..................... | H01M 8/02 |
| | | | | | | 429/456 |
| 5,928,448 | A | * | 7/1999 | Daws | ....................... | B23P 6/00 |
| | | | | | | 156/92 |
| 6,135,006 | A | | 10/2000 | Strasser et al. | | |
| 6,326,095 | B1 | | 12/2001 | Kneidel | | |

(Continued)

FOREIGN PATENT DOCUMENTS

| CN | 101527366 A | 9/2009 |
| JP | 10-106610 | 4/1998 |

(Continued)

OTHER PUBLICATIONS

Swain et al., A Brief Review on Ceramic Matrix Composites, It's Attributes and It's Utility in Future Generation Gas Turbine, International Journal for Innovative Research in Science & Technology, vol. 1, Issue 6, pp. 290-292 (Year: 2014).*

(Continued)

*Primary Examiner* — Jayne L Mershon
(74) *Attorney, Agent, or Firm* — The Marbury Law Group PLLC

(57) ABSTRACT

A fuel cell stack assembly includes a fuel cell stack column, and side baffles disposed on opposing sides of the column. The side baffles include side baffle plates containing at least one ceramic matrix composite (CMC) panel having at least one hole, and at least one denser ceramic element joined to the at least one CMC panel at the hole in the CMC panel.

7 Claims, 25 Drawing Sheets

(56) References Cited

U.S. PATENT DOCUMENTS

| | | | |
|---|---|---|---|
| 6,413,665 | B1 | 7/2002 | Blanchet et al. |
| 8,785,074 | B2 | 7/2014 | Edmonston et al. |
| 9,638,133 | B2* | 5/2017 | Kramer ............... F02K 1/822 |
| 2002/0006535 | A1* | 1/2002 | Woods ............... F23D 11/443 |
| | | | 429/411 |
| 2003/0235746 | A1 | 12/2003 | Haltiner et al. |
| 2004/0247982 | A1 | 12/2004 | Sabin et al. |
| 2005/0048347 | A1 | 3/2005 | Takashita et al. |
| 2006/0006108 | A1 | 1/2006 | Arias et al. |
| 2007/0196704 | A1 | 8/2007 | Valensa et al. |
| 2008/0038622 | A1 | 2/2008 | Valensa et al. |
| 2008/0182152 | A1 | 7/2008 | Erikstrup |
| 2008/0248349 | A1 | 10/2008 | McElroy et al. |
| 2008/0280178 | A1 | 11/2008 | Spink et al. |
| 2008/0311457 | A1 | 12/2008 | Andreas-Schott et al. |
| 2010/0015491 | A1* | 1/2010 | Yamanis ............. H01M 8/0247 |
| | | | 429/515 |
| 2010/0221485 | A1 | 9/2010 | Vance et al. |
| 2011/0076585 | A1* | 3/2011 | Edmonston ........ H04N 1/00381 |
| | | | 429/454 |
| 2013/0216927 | A1* | 8/2013 | Gottmann .......... H01M 8/2425 |
| | | | 429/431 |
| 2014/0134515 | A1* | 5/2014 | Shinohara ............ H01M 8/12 |
| | | | 429/465 |
| 2014/0162166 | A1* | 6/2014 | Nishiyama ........... H01M 8/247 |
| | | | 429/465 |
| 2014/0242492 | A1 | 8/2014 | Edmonston et al. |
| 2016/0226093 | A1 | 8/2016 | Edmonston et al. |

FOREIGN PATENT DOCUMENTS

| | | |
|---|---|---|
| JP | H10134834 A | 5/1998 |
| JP | 2004349052 A | 12/2004 |
| JP | 2006512543 | 4/2006 |
| JP | 2007280890 A | 10/2007 |
| JP | 2008053078 A | 3/2008 |
| JP | 2013506963 A | 2/2013 |
| JP | 2014132558 A | 7/2014 |
| WO | WO2002/027834 A2 | 4/2002 |
| WO | WO2008/089977 A1 | 7/2008 |
| WO | WO2008/110292 A1 | 9/2008 |

OTHER PUBLICATIONS

International Search Report, International Application No. PCT/US2010/050577, dated Jun. 30, 2011.

International Preliminary Report on Patentability, International Application No. PCT/US2010/050577, dated Apr. 12, 2012.

EP Application No. 10821119, Supplemental European Search Report, dated Nov. 25, 2014, 8pgs.

Japan Application No. 2012532243, Reasons for Rejection, dated Sep. 16, 2014.

U.S. Appl. No. 15/008,726, filed Jan. 28, 2016, Bloom Energy Corporation.

International Search Report and Written Opinion of the International Searching Authority for International Patent Application No. PCT/US2018/050147, dated Jan. 18, 2019, 11 pages.

Korean IP Office Communication, Notification of Preliminary Rejection for Korean Patent Application No. 10-2018-7032214, dated Mar. 30, 2020, 10 pages.

Notification Concerning Transmittal of International Preliminary Report on Patentability and Written Opinion of the International Searching Authority for International Patent Application No. PCT/US2018/050147, dated Apr. 16, 2020, 8 pages.

Korean IP Office Communication, Notice of Decision to Refuse a Patent ("Final Rejection") for Korean Patent Application No. 10-2018-7032214, dated Jul. 30, 2020, 4 pages, Reviewed in global dossier available through EP espacenet site.

Korean IP Office Communication, Notice of Decision to Refuse a Patent ("Notice of Final Rejection") for Korean Patent Application No. 10-2018-7032214, dated Nov. 27, 2020, 7 pages (including English-language translation).

* cited by examiner

METHOD FOR JOINING A CERAMIC MATRIX COMPOSITE TO DENSE CERAMICS FOR IMPROVED JOINT STRENGTH

FIELD

Aspects of the present disclosure relate generally to a method for joining a ceramic matrix composite (CMC) to dense ceramics for a fuel cell system, and CMC/dense ceramic joint for a fuel cell system.

BACKGROUND

U.S. application Ser. No. 11/656,563, filed on Jan. 23, 2007 and published as U.S. published application 2007/0196704 A1 and incorporated herein by reference in its entirety, describes a fuel cell system in which the solid oxide fuel cell (SOFC) stacks are located on a base, as shown in FIG. 1. Wedge shaped ceramic side baffles 220 (e.g., having a non-uniform thickness and a roughly triangular cross sectional shape in the horizontal direction) are located between adjacent fuel cell stacks 14 (or columns of fuel cell stacks). The baffles 220 serve to direct the cathode feed into the cathode flow paths and to fill the space between adjacent stacks so that the cathode feed passes through each of the stacks 14, rather than bypassing around the longitudinal sides of the stacks 14. The baffles 220 are held in place by tie rods 222 that pass through closely fitting bores 224 centrally located in each of the baffles 220. Preferably, the baffles 220 are electrically non-conductive and made as one unitary piece from a suitable ceramic material. FIG. 1 also shows fuel distribution manifolds between the stacks in the stack column and fuel inlet and exhaust conduits connected to the manifolds.

In this prior art system, the SOFC stacks maintain a compressive load. The compressive load is maintained by upper pressure plate 230, tie rods 222, lower pressure plate 90 and a compression spring assembly located below the lower pressure plate 90. The compression spring assembly applies a load directly to the lower pressure plate 90 and to the upper pressure plate 230 via the tie rods 222. The bores or feed-throughs 224 through the baffles 220 act as heat sinks and thereby decrease the system efficiency.

In an alternative embodiment, the load is transmitted through the base 239 as this is the only zero datum of the system. Penetrations or feed-throughs through the base 239 are used in order to pull the required load from the base 239.

SUMMARY

According to one embodiment, a fuel cell stack assembly includes a fuel cell stack column, and side baffles disposed on opposing sides of the column. The side baffles include side baffle plates containing at least one CMC panel having at least one hole, and at least one denser ceramic element joined to the at least one CMC panel at the hole in the CMC panel.

According to another embodiment, a fuel cell stack assembly comprises a fuel cell stack column, an upper block disposed on a first end of the column, a lower block disposed on an opposing second end of the column, and side baffles disposed on opposing sides of the column and connected to the upper block and the lower block by pins which extend through holes in the side baffles into respective holes in the upper block and the lower block.

According to another embodiment, a ceramic matrix composite (CMC) structure comprises at least one CMC panel, and at least one denser ceramic element joined to the at least one CMC panel at a hole in the CMC panel.

According to another embodiment, a fuel cell stack assembly comprises a fuel cell stack column, and side baffles disposed on opposing sides of the column, wherein the side baffles comprise side baffle plates include at least one CMC panel having a hole, and a glass seal which is deposited inside of the hole in the CMC panel. In one embodiment, the glass seal does not extend out of the hole onto or over a major surface of the CMC panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION

Figure 1:
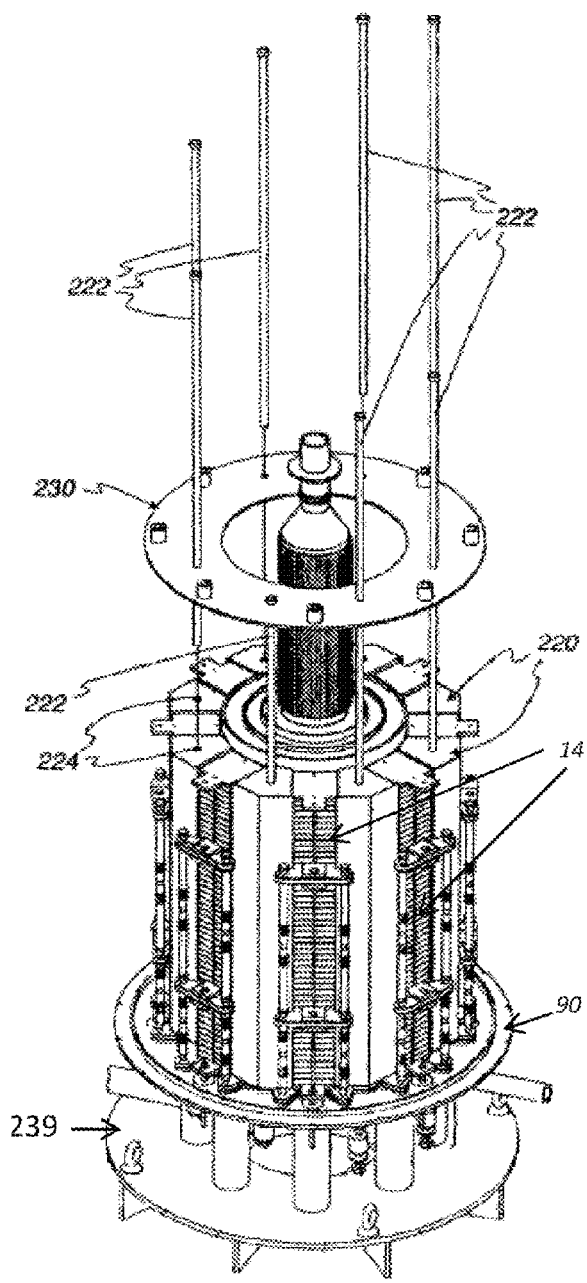
FIG. 1 illustrates a three dimensional view of a conventional fuel cell assembly.

The present disclosure is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The bores or feed-throughs 224 of the system of FIG. 1 decrease the system efficiency because they create heat sinks. The bores 224 can be eliminated and a compressive load applied to the fuel cell stacks 14 by redesigning the baffles 220. By applying the compressive stress with the baffles themselves, the tie rods 222 can be eliminated, and thus, the bores 224 can be eliminated. Thus, in one embodiment, the baffles lack bore holes that extend vertically through the baffles and tie rods located in the holes.

Figure 2:
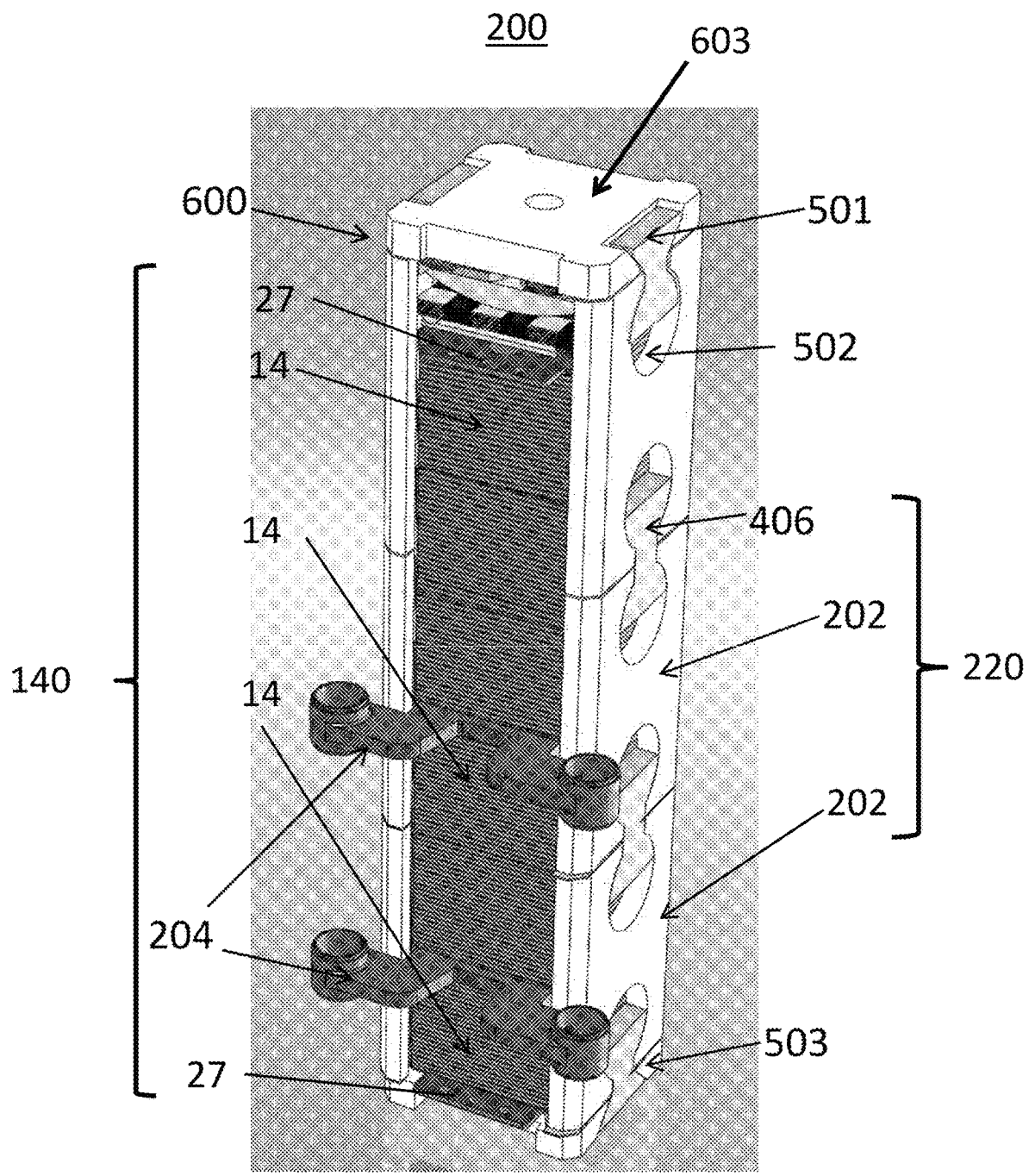
FIG. 2 illustrates a three dimensional view of a fuel cell stack assembly according to an exemplary embodiment of the present disclosure.

FIG. 2 illustrates a fuel cell stack assembly 200 according to various embodiments of the present disclosure. Referring to FIG. 2, the fuel cell stack assembly 200 includes a fuel cell stack column 140, side baffles 220 disposed on opposing sides of the column 140, a lower block 503, and a compression assembly 600 including an upper block 603. The column includes three fuel cell stacks 14, fuel manifolds 204 disposed between the fuel cell stacks 14, and termination plates 27 disposed on opposing ends of the column 140. The fuel cell stacks 14 include a plurality of fuel cells stacked upon one another and separated by interconnects. A plurality of the fuel cell stack assemblies 200 may be attached to a base 239, as shown in FIG. 1.

An exemplary fuel manifold 204 is described in the U.S. application Ser. No. 11/656,563 noted above. Any number of fuel manifolds 204 may be provided between adjacent end plates of adjacent fuel cells of the fuel cell stacks 14, as desired.

The side baffles 220 connect the upper block 603 of the compression assembly 600 and the lower block 503. The side baffles 220, the compression assembly 600, and the lower block 503 may be collectively referred to as a "stack housing". The stack housing is configured to apply a compressive load to the column 140. The configuration of the stack housing eliminates costly feed-throughs and resulting tie rod heat sinks and uses the same part (i.e., side baffle 220) for two purposes: to place the load on the stacks 14 and to direct the cathode feed flow stream (e.g., for a ring shaped arrangement of stacks shown in FIG. 1, the cathode inlet stream, such as air or another oxidizer may be provided from a manifold outside the ring shaped arrangement through the stacks and the exit as a cathode exhaust stream to a manifold located inside the ring shaped arrangement). The side baffles 220 may also electrically isolate the fuel cell stacks 14 from metal components in the system. The load on the column 140 may be provided by the compression assembly 600, which is held in place by the side baffles 220 and the lower block 503. In other words, the compression assembly 600 may bias the stacks 14 of the column 140 towards the lower block 503.

The side baffles 220 are plate-shaped rather than wedge-shaped and include baffle plates 202 and ceramic inserts 406 configured to connect the baffle plates 202. In particular, the baffle plates 202 include generally circular cutouts 502 in which the inserts 406 are disposed. The inserts 406 do not completely fill the cutouts 502. The inserts 406 are generally bowtie-shaped, but include flat edges 501 rather than fully rounded edges. Thus, an empty space remains in the respective cutouts 502 above or below the inserts 406.

The side baffles 220 and baffle plates 202 have two major surfaces and one or more (e.g., four) edge surfaces. One or more of the edge surfaces may have an area at least 5 times smaller than each of the major surfaces. Alternatively, one or more edge surfaces may have an area at least 4 times or 3 times smaller than at least one of the major surfaces. Preferably, the baffle plates 202 have a constant width or thickness, have a substantially rectangular shape when viewed from the side of the major surface, and have a cross sectional shape which is substantially rectangular. In alternative embodiments, the ceramic side baffles 220 are not rectangular, but may have a wedge shaped cross-section. That is, one of the edge surfaces may be wider than the opposing edge surface. However, unlike the prior art baffles, which completely fill the space between adjacent electrode stacks 14, the side baffles 220 of this embodiment are configured so that there is space between side baffles 220. In other words, the side baffles 220 of this embodiment do not completely fill the space between adjacent columns 140. In other embodiments, wedge-shaped metal baffles may be inserted between adjacent side baffles 220, similar to the configuration shown in FIG. 1.

Generally, the side baffles 220 are made from a high-temperature tolerant material, such as alumina or other suitable ceramic. In various embodiments, the side baffles 220 are made from a ceramic matrix composite (CMC). The CMC may include, for example, a matrix of aluminum oxide (e.g., alumina), zirconium oxide or silicon carbide. Other matrix materials may be selected as well. The fibers may be made from alumina, carbon, silicon carbide, or any other suitable material. The lower block 503 and the compression assembly 600 may also be made of the same or similar materials. The selection of particular materials for the compression housing is discussed in detail, below.

Any combination of the matrix and fibers may be used. Additionally, the fibers may be coated with an interfacial layer designed to improve the fatigue properties of the CMC. If desired, the CMC baffles may be made from a unitary piece of CMC material rather than from individual interlocking baffle plates. The CMC material may increase the baffle strength and creep resistance. If the baffles are made from alumina or an alumina fiber/alumina matrix CMC, then this material is a relatively good thermal conductor at typical SOFC operating temperatures (e.g., above 700° C.). If thermal decoupling of neighboring stacks or columns is desired, then the baffles can be made of a thermally insulating ceramic or CMC material.

Other elements of the compression housing, such as the lower block 503 and the compression assembly 600 may also be made of the same or similar materials. For example, the lower block 503 may comprise a ceramic material, such as alumina or CMC, which is separately attached (e.g., by the inserts, dovetails or other implements) to the side baffles 220 and to a system base 239. The use of the ceramic block material minimizes creation of heat sinks and eliminates the problem of linking the ceramic baffles to a metal base, which introduces thermal expansion interface problems. The selection of particular materials for the components of the compression housing is discussed in detail, below.

Figure 3:
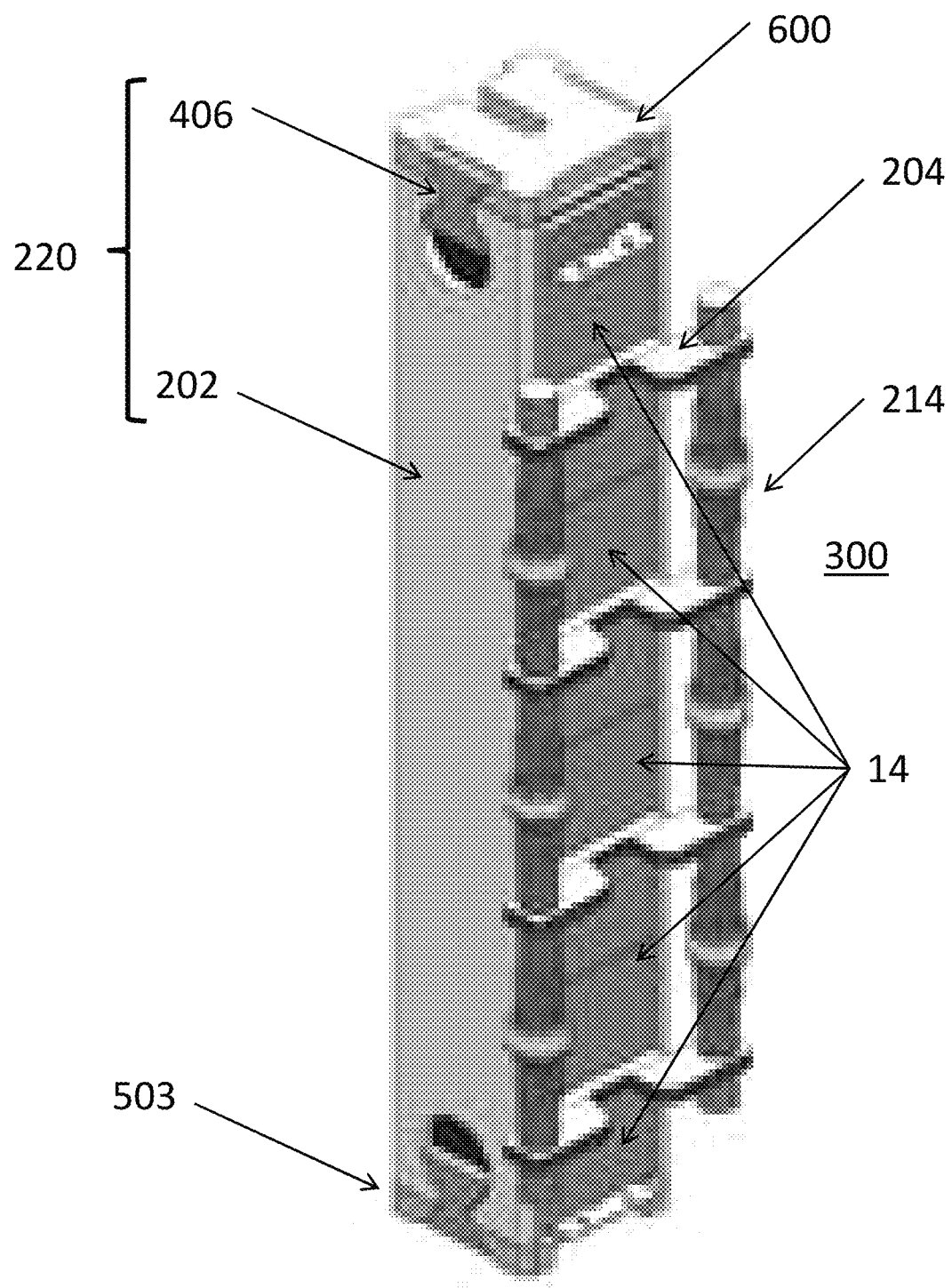
FIG. 3 illustrates a three dimensional view of a fuel cell stack assembly according to an exemplary embodiment of the present disclosure.

FIG. 3 illustrates a fuel cell stack assembly 300 according to various embodiments of the present disclosure. The fuel cell stack assembly 300 is similar to the fuel cell stack assembly 200, so only the differences therebetween will be discussed in detail. Similar elements have the same reference numbers. Fuel rails 214 (e.g. fuel inlet and outlet pipes or conduits) connect to fuel manifolds 204 located between the stacks 14 in the column.

Referring to FIG. 3, the fuel cell stack assembly 300 includes side baffles 220 disposed on opposing sides of the column of fuel cell stacks 14. However, each of the side baffles 220 includes only a single baffle plate 202, rather than the multiple baffle plates 202 of the fuel cell stack assembly 200. In addition, the side baffles 220 include ceramic inserts 406 to connect the baffle plates 202 to a compression assembly 600 and a lower block 503.

Figure 4:
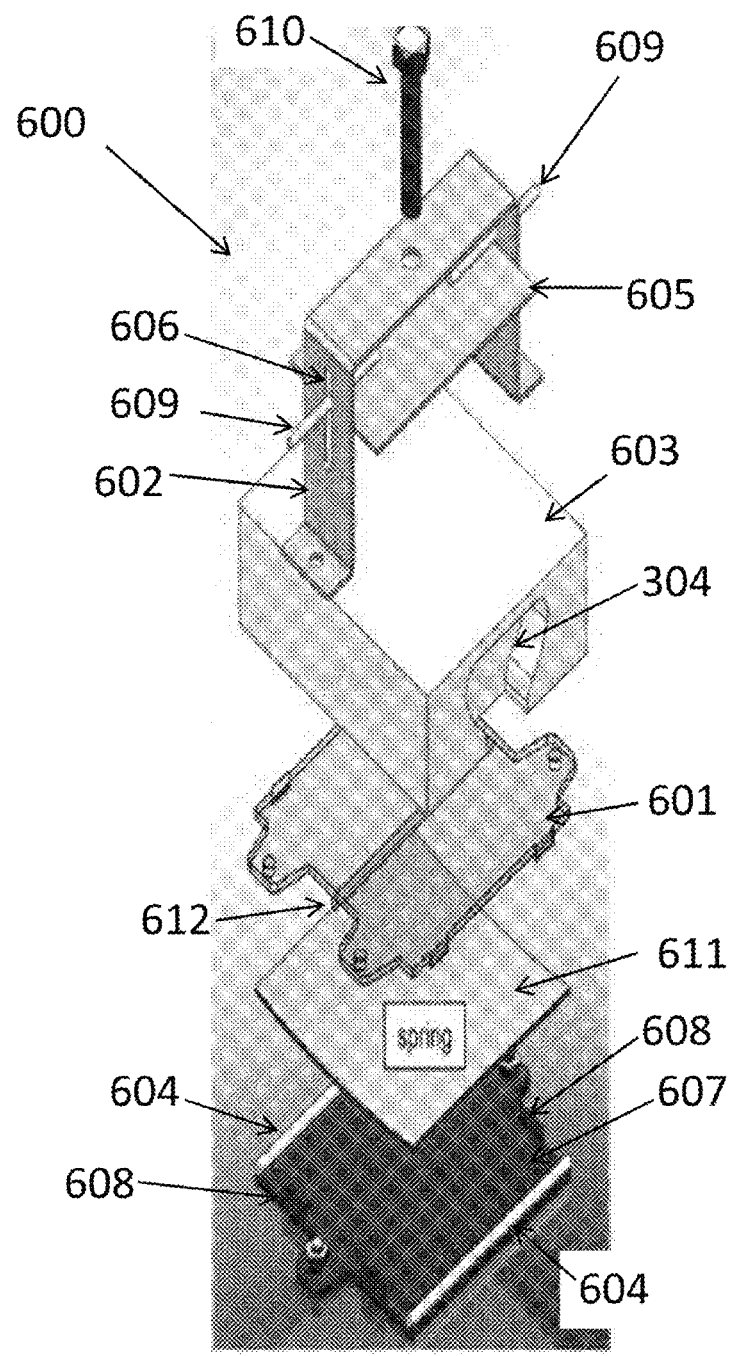
FIG. 4 illustrates an exploded view of a compression assembly according to an exemplary embodiment of the present disclosure.

FIG. 4 illustrates an embodiment of a compression assembly 600 that may be used in conjunction with any of the embodiments described above. Referring to FIG. 4, the compression assembly 600 may be used to apply a compressive load to the column of fuel cell stacks 14. The compression assembly 600 includes a spring 611. As illustrated, spring 611 is a ceramic (e.g., CMC or alumina) leaf spring. A CMC spring is advantageous because it may include creep resistant fibers arranged in a direction in the matrix which resists creep. The ceramic spring can exist in a high temperature zone and allow for travel from differential thermal expansion from components applying the load to the stack. However, any other type of spring or combination of springs may be used. For example, the spring 611 may be a coil spring, a torsion spring, or a volute spring.

The compression assembly 600 may include a rod plate 607 configured to provide a resilient surface against which the spring 611 can generate a compressive load. Preferably, the rod plate 607 includes retention barriers 608 configured to prevent the spring 611 from sliding off the rod plate 607. When using a leaf spring, the rod plate 607 may also include spring support rods 604. In this configuration, the spring 611 may be placed on top of the spring support rods 604 in an unstressed condition (see also FIG. 5).

An upper plate 601 is provided on top of the spring 611, that is, on the opposite side of the spring 611 from the rod plate 607. The upper plate 601 may include a spring tensioner 612, in this embodiment a rod, on the bottom of the upper plate 601. The spring tensioner 612 is preferably located approximately in the center of the upper plate 601. The compression assembly 600 may also be provided with an upper block 603 which may include either cutouts 304 (which accept inserts 406 from baffles as illustrated) or protrusions 303 by which compression assembly 600 may be attached to the side baffles 220.

A temporary tightening mechanism may be attached over or to the compression assembly 600 during the process of connecting the assembly to the baffles 220. In the embodiment of FIG. 4, this mechanism includes a bracket 602. The bracket 602 may be affixed to the rod plate 607 by bolts as illustrated or by any other suitable mechanism. Movably attached to the bracket 602 is a temporary tensioner which in this embodiment comprises a pressure plate 605. As illustrated, the pressure plate 605 is movably attached to the bracket 602 by way of rods 609 which slide in elongated slots 606.

The compression load applied by the compression assembly 600 may be adjusted via a pressure adjusting mechanism 610. The pressure adjusting mechanism 610 may be, for example, a screw or bolt which may be raised or lowered by rotating. In the embodiment illustrated in FIG. 4, lowering the pressure adjusting mechanism 606 causes the pressure plate 605 to travel downward. As the pressure plate 605 lowers, it forces the upper block 603 and the upper plate 601 to lower as well. When the upper plate 601 lowers, the spring tensioner 612 is forced against the center of the spring 611, causing it to bend and thereby apply a load to the spring 611.

In use, the pressure adjusting mechanism 610 is lowered (and the spring 611 compressed) until the upper block 603 can be connected (e.g., hooked) to the side baffles 220. Once the side baffles 220 are connected via dovetails, inserts or other implements, the pressure adjusting mechanism 610 is loosened to release the bracket 602. The force of the spring 611, previously "held" by the pressure adjusting mechanism 610, is now transferred to the side baffles 220. Adjustment of the compressive force on the stack may be attained by fitting shims (not shown) between the compression assembly 600 and the top of the column of stacks 14 (which sits below the rod plate 607 of the compression assembly 600). More shims create a tighter compression. The pressure adjusting mechanism 610 provides pretension to allow connection of the compression assembly 600 to the side baffles 220. The bracket 602, including mechanism 610 and elements 605, 606 and 609 are then removed from the fuel cell column before the column is placed into an operating mode.

Figure 5:
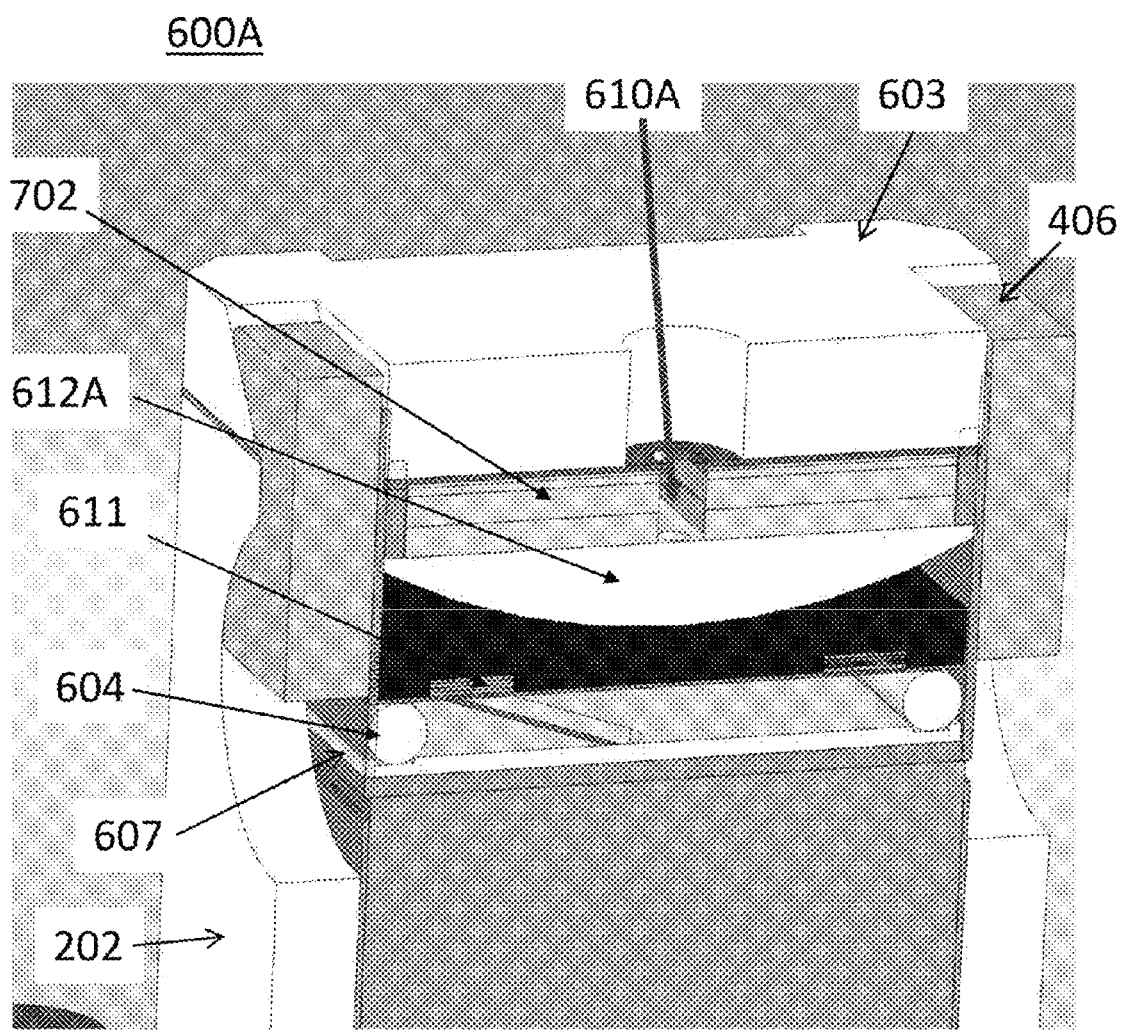
FIG. 5 illustrates a cross-sectional view of a compression assembly according to an exemplary embodiment of the present disclosure.

FIG. 5 illustrates another embodiment of a compression assembly 600A. This embodiment is similar to the previous embodiment. However, the rod shaped spring tensioner 612 is replaced with a dome shaped spring tensioner 612A, where the curved side of the dome is in contact with the upper surface of the spring. Spring support rods 604 contact edge portions of a lower surface of the spring 611 to induce bending in the spring. Additionally, this embodiment includes spacers 702 which reduces the distance between the block 603 and the spring 611, thereby reducing the amount of adjustment required with the temporary tightening mechanism, such as a bolt or screw (not shown for clarity) to apply a load to the spring 611 through opening 610A.

Figures 6A, 6B:
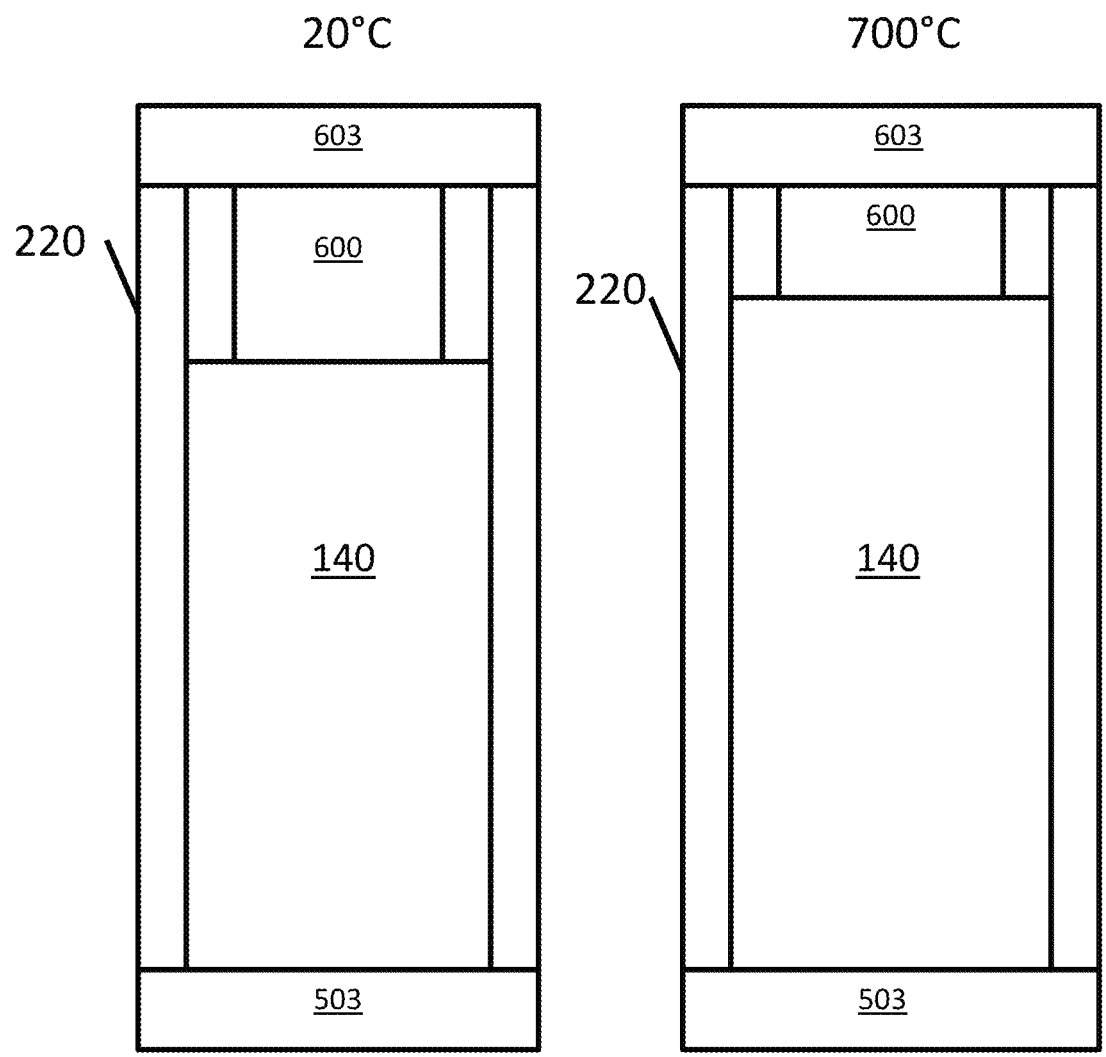
FIGS. 6A and 6B are schematic front views of a fuel cell stack assembly at 20° C. and 700° C., respectively.

FIGS. 6A and 6B illustrate are schematic views of a fuel cell stack assembly, which may be any of the above-described fuel cell stack assemblies 200, 300, or another type of fuel cell stack assembly, at 20° C. and 700° C., respectively. Referring to FIGS. 6A and 6B, the coefficient of thermal expansion (CTE) of the column 140 of fuel cell stacks may be different from the CTE of the side baffles 220. For example, the CTE of the column 140 may be about 9.7, at room temperature. The CTE of the side baffles 220 may about 7.2 at room temperature, if the side baffles 220 are formed of about 99 wt % alumina. Accordingly, as shown in FIGS. 6A and 6B, as the fuel cell stack assembly is heated, the column 140 expands faster than the side baffles, resulting in increased deflection of the compression assembly 600. As such, the load applied to the column 140 is increased. Although compression assembly 600 is shown, any of the above-described compression assemblies may be used.

It is also important to note that the spring constant of the compression assembly may be highly non-linear. Further, since the compression assembly is already deflected at 20° C., the additional deflection at 700° C. may apply a substantially higher load to the column 140. Based on modeling, it is calculated that an original load of 350 lbs at room temperature can exceed 1000 lbs, when the column 140 heats up to 650° C. (before the interface seals melt). The opposite scenario is also true, in that the load on the column 140 will be reduced significantly, if the column 140 is cooled from a high temperature. The fundamental reason for this difference is the CTE difference between the column 140 and the side baffles. The increased loading at high temperatures may result in damage to the fuel cell stacks of the column 140 and/or other components of the fuel cell stack assembly.

In order to overcome or reduce the above and/or other problems, the side baffles 220 of the above embodiments may be configured to have a CTE that is substantially the same (within about +/−20%, such as +/−10%) as the CTE of the column 140. According to some embodiments, the CTE of the baffle plates 202 may be within about +/−5% of the CTE of the column 140. The CTE of the side baffles may be altered by altering the composition of one or more components of the side baffles 220. Herein, the CTE of an element refers to a CTE of the element at room temperature.

For example, when the side baffles each include a single baffle plate 202, as shown in the embodiment of FIG. 3, the baffle plates 202 can be formed of a material having a CTE that is similar to the CTE of the column 140. In particular, the CTE of the baffle plates 202 may be within about +/−20%, such as +/−10% of the CTE of the column 140. The CTE of the baffle plates 202 may be controlled by doping or mixing alumina with other ceramic components, or by choosing different material sets. The following Table 1 includes exemplary ceramic materials that may be included in the side baffles and corresponding CTE's. However, the present disclosure is not limited to such materials, as other suitable materials may be used.

TABLE 1

| Material | CTE (Room Temperature) |
|---|---|
| Alumina | 7.2 |
| Zirconia (Tetragonal) | 12 |
| Magnesia | 13.5 |
| Alumina-Titania Mixture | 9.7 |
| Zirconia-Magnesia Mixture | 12 |

As shown in Table 1, an alumina-titania mixture may be prepared to have a CTE of 9.7, which is substantially the same as the CTE of a column of fuel cell stacks. As such, a side baffle 220 including an alumina-titania mixture expands at substantially the same rate as the column 140, which prevents excessive loading of the column 140 during heating.

Further, zirconia (tetragonal phase), magnesia, and a zirconia-magnesia mixture exhibit CTE's that are slightly higher than 9.7. As such, side baffles 220 including these materials could also prevent excessive loading of the column 140 during heating. While these materials would expand at a higher rate than the column 140, such a difference can be compensated for by a compression assembly, since the spring constant of the compression assembly 600 may be more linear at lower levels of compression. Side baffles 220 can include a mixture of alumina and magnesia, or a mixture of alumina and zirconia, with amount ratios of the mixtures configured such that the side baffles 220 and the column 140 have substantially the same CTE.

The baffle plates 202 and the ceramic inserts 406 of the side baffles 220 may be formed of the same material. However, according to some embodiments, the baffle plates 202 and the ceramic inserts 406 may be formed of different materials that have CTE's that are higher or lower than the CTE of the column 140, so long as the total CTE of the side baffles 220 is similar to the CTE of the column 140.

Figure 7A:
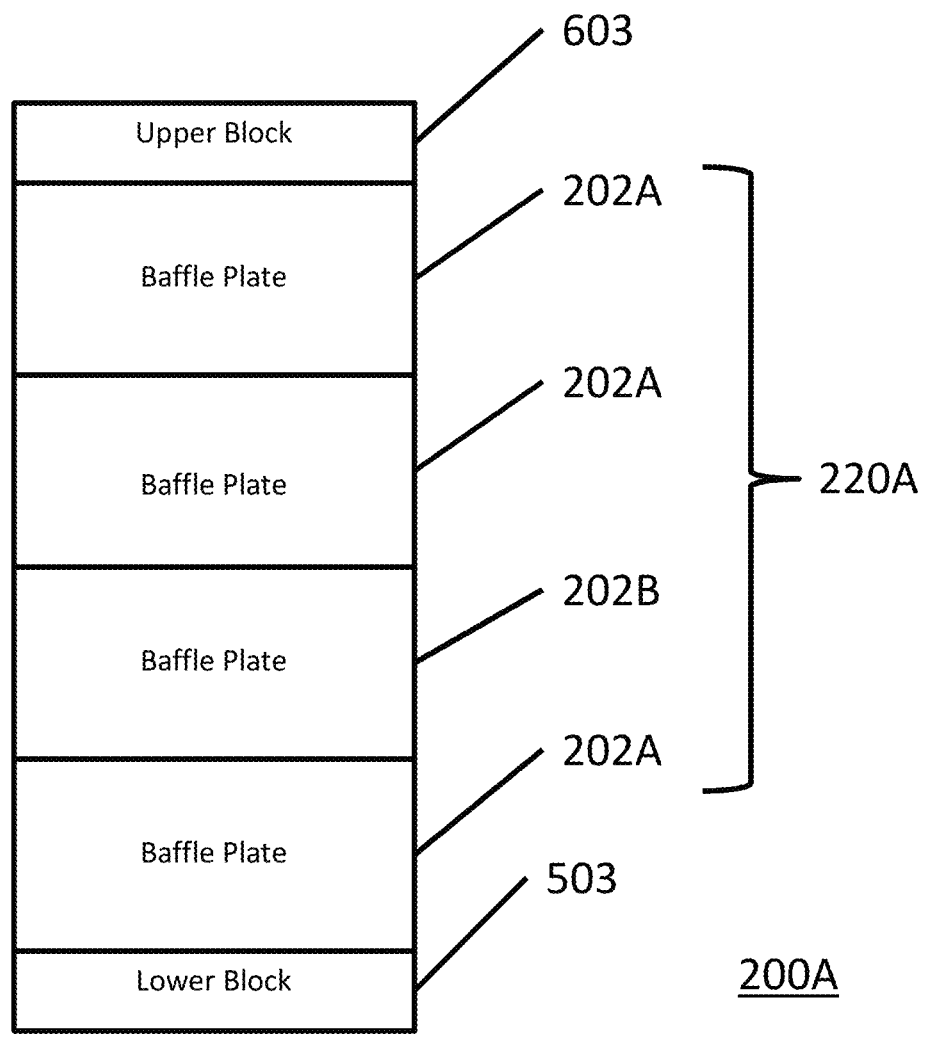
FIG. 7A is a schematic side view of baffle plates of a modified version of the fuel cell stack assembly of FIG. 2, according to an exemplary embodiment of the present disclosure.

FIG. 7A is a schematic view of a fuel cell stack assembly 200A, according to various embodiments of the present disclosure. Referring to FIG. 7A, the fuel cell stack assembly 200A includes a side baffle 220A, an upper block 603, a lower block 503, and a fuel cell stack column (not shown). The side baffle 220A includes first baffle plates 202A and second baffle plates 202B, which are alternately disposed. Although not shown, ends of the baffle plates 202A, 202B may be connected to one another using ceramic inserts or through interlocking cutouts and protrusions, as described above.

The baffle plates 202A, 202B are substantially the same size and shape, but have different CTE's. However, the overall CTE of the side baffle 220A may be similar to the CTE of a fuel cell stack column. In particular, In particular, the CTE of the side baffle 220A may be within about +/−20%, such as +/−10% of the CTE of the fuel cell column.

For example, when the fuel cell stack has a CTE of about 9.7, the side baffle 220A may have a CTE ranging from about 8.7 to about 10.7.

According to some embodiments, the first baffle plates 202A may be formed of alumina, which has a CTE of about 7.2, and the second baffle plates 202B may be formed of tetragonal zirconia, which has a CTE of about 12. Accordingly, the CTE of the side baffle 220A may be about 9.6, i.e., the average of 7.2 and 12. Thus, the side baffle 220A may have a CTE that is substantially the same as the 9.7 CTE of a typical fuel cell stack column. However, according to some embodiments, the CTE of the first side baffle plates 202A may be higher than the CTE of the stack 14, and the CTE of the second side baffle plates 202B may be lower than the CTE of the stack 14, so long as the total CTE of the side baffle 220A is within about +/−20%, such as +/−10% of the CTE of the fuel cell stack column.

While four baffle plates are shown in FIG. 7A, the present disclosure is not limited to any particular number of baffle plates. In addition, while the first baffle plates 202A and second baffle plates 202B are alternately disposed in FIG. 7A, other arrangements may be utilized, so long as the CTE of the side baffle 220A is similar to that of a fuel cell stack column included in the fuel cell stack assembly 200A.

Figure 7B:
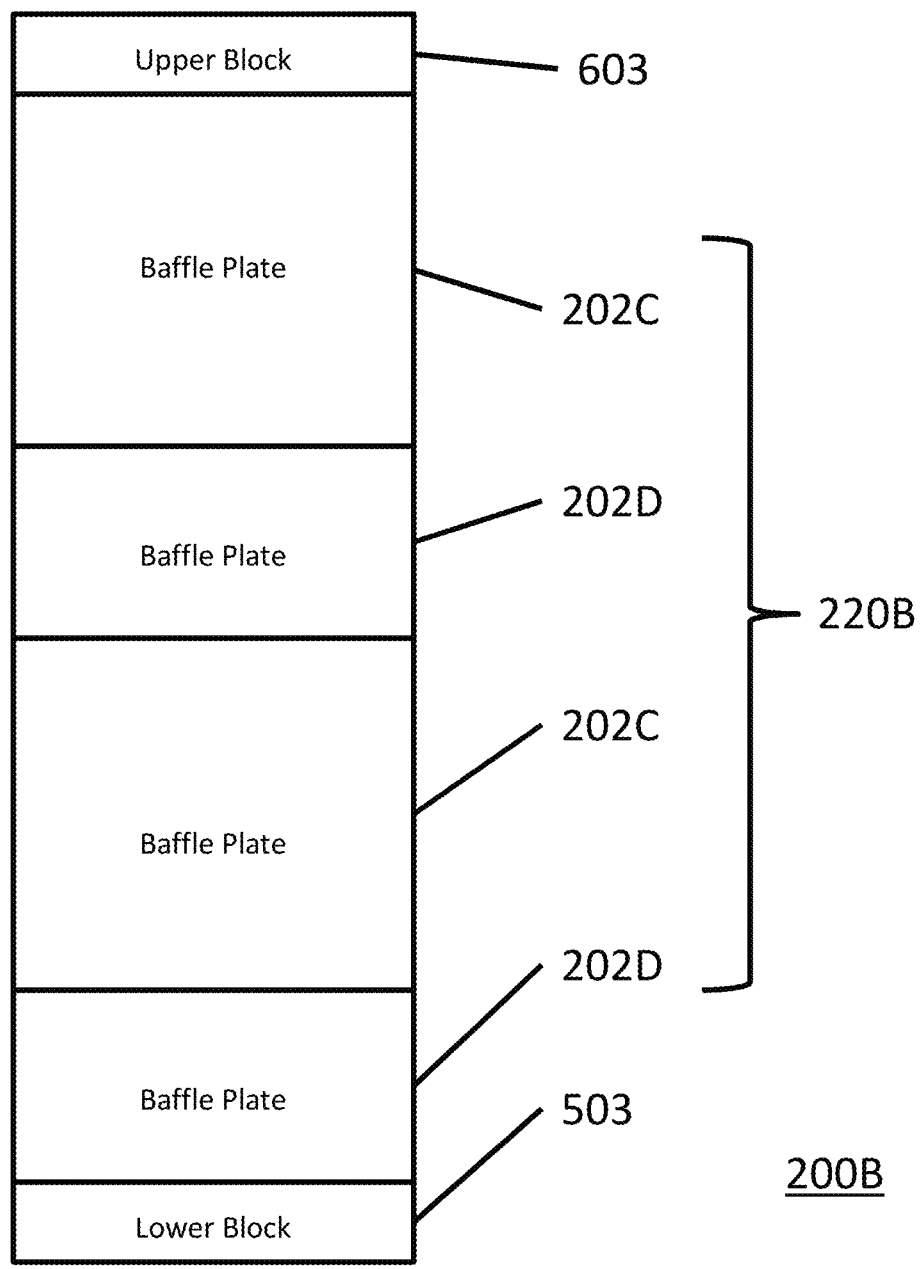
FIG. 7B is a schematic side view of baffle plates of a modified version of the fuel cell stack assembly of FIG. 2, according to an exemplary embodiment of the present disclosure.

FIG. 7B is a schematic view of a fuel cell stack assembly 200B, according to various embodiments of the present disclosure. The fuel cell stack assembly 200B is similar to the fuel cell stack assembly 200A, so only the difference therebetween will be discussed in detail.

Referring to FIG. 7B, the fuel cell stack assembly 200B includes a side baffle 220B, an upper block 603, a lower block 503, and a fuel cell stack column (not shown). The side baffle 220B includes first baffle plates 202C and second baffle plates 202D, which are alternately disposed. Although not shown, the baffle plates 202C, 202D may be connected to one another using ceramic inserts or through interlocking cutouts and protrusions, as described above.

The first and second baffle plates 202C, 202D may include materials having different CTE's. However, in contrast to the fuel cell stack assembly 200A, the first and second baffle plates 202C, 202D may have different lengths (i.e., heights in the stack stacking direction). As such, that the overall CTE of the side baffle 220B may be set to be substantially the same as the CTE of the fuel cell stack column, by varying the lengths of the first and second baffle plates 202C, 202D. In other words, varying the lengths of the first and second baffle plates 202C, 202D allows for the use of a wider variety of ceramic materials, since varying the length of a baffle plates can change the actual linear expansion of the plate, and thereby compensate for the use of different materials having an average CTE that is not substantially the same as that of a fuel cell stack column. For example, baffle plates having a higher CTE may be made relatively shorter, and/or baffle plates having a lower CTE may be made relatively longer, to compensate for CTE variations. However, the lengths of baffle plates that deviate more from the CTE of the fuel cell stack column can be adjusted in consideration of the CTE of the other baffle plates, such that the CTE of the corresponding side baffle is within +/−20%, such as +/−10% of the CTE of the fuel cell stack column.

In particular, when considering a side baffle including only two baffle plates 202C, 202D, if the first baffle plate 202C is formed of material A having a CTE of 7.2, and the second baffle plate 202D is formed of material B having a CTE of 14, a ratio of the lengths of the first and second baffle plates 202C, 202D would be 14/7.2. As such, a length A of the first baffle plate 202C and a length B of the second baffle plate 202D can be determined using the following Equations 1 and 2:

$$\text{CTE } B = \text{CTE } A * (\text{Length } A / \text{Length } B) \quad \text{Equation 1}$$

$$\text{CTE Stack} * \text{Length Stack} = \text{CTE } A * \text{Length } A + \text{CTE } B * \text{Length } B. \quad \text{Equation 2}$$

Accordingly, the total CTE of a side baffle including two baffle plates may be adjusted by adjusting the lengths of the baffle plates included therein, in view of the materials used to form the baffle plates. Further, the present disclosure is applicable to side baffles that include fewer or additional baffle plates. For example, in the side baffle 220B, the total lengths of baffle plates 202C can be used as the length A, and the total length of the baffle plates 202D can be used as length B, in Equation 1. Equations 1 and 2 can be expanded to include additional components and/or materials, such as a third type of baffle plate. It should also be noted that the CTE of any ceramic inserts used to connect baffle plates should also be accounted for in determining the CTE of a side baffle.

Conventionally, fuel cell stack assemblies may be disposed in close proximity to one another, to reduce space requirements. In addition, ceramic components are pressed to a particular design thickness, limiting the functionality thereof to providing structural and dielectric characteristics.

In view of such drawbacks, various embodiments of the above-described ceramic components may be formed of multiple bonded (laminated) layers, which can have internal features/flow paths that are beneficial for improving dielectric strength, providing flow channels, temperature control, and instrumentation insertion. With regard to dielectric strength, ceramic components formed of layers of different materials can be prepared. For example, layers of ceramic components that are disposed relatively close to a fuel cell stack column may include materials having a higher dielectric strength, such as different ceramic compositions, different purities of alumina, and CMCs, than layers disposed further from the stack.

Ceramic components may also include layers of different thermal conductivity to manage the thermal profile of the fuel cell stack column. Further, layers can be configured provide space for instrumentation, such as probes, stress detectors, thermocouples, voltage detectors, bypass conductors, and the like.

Figure 8:
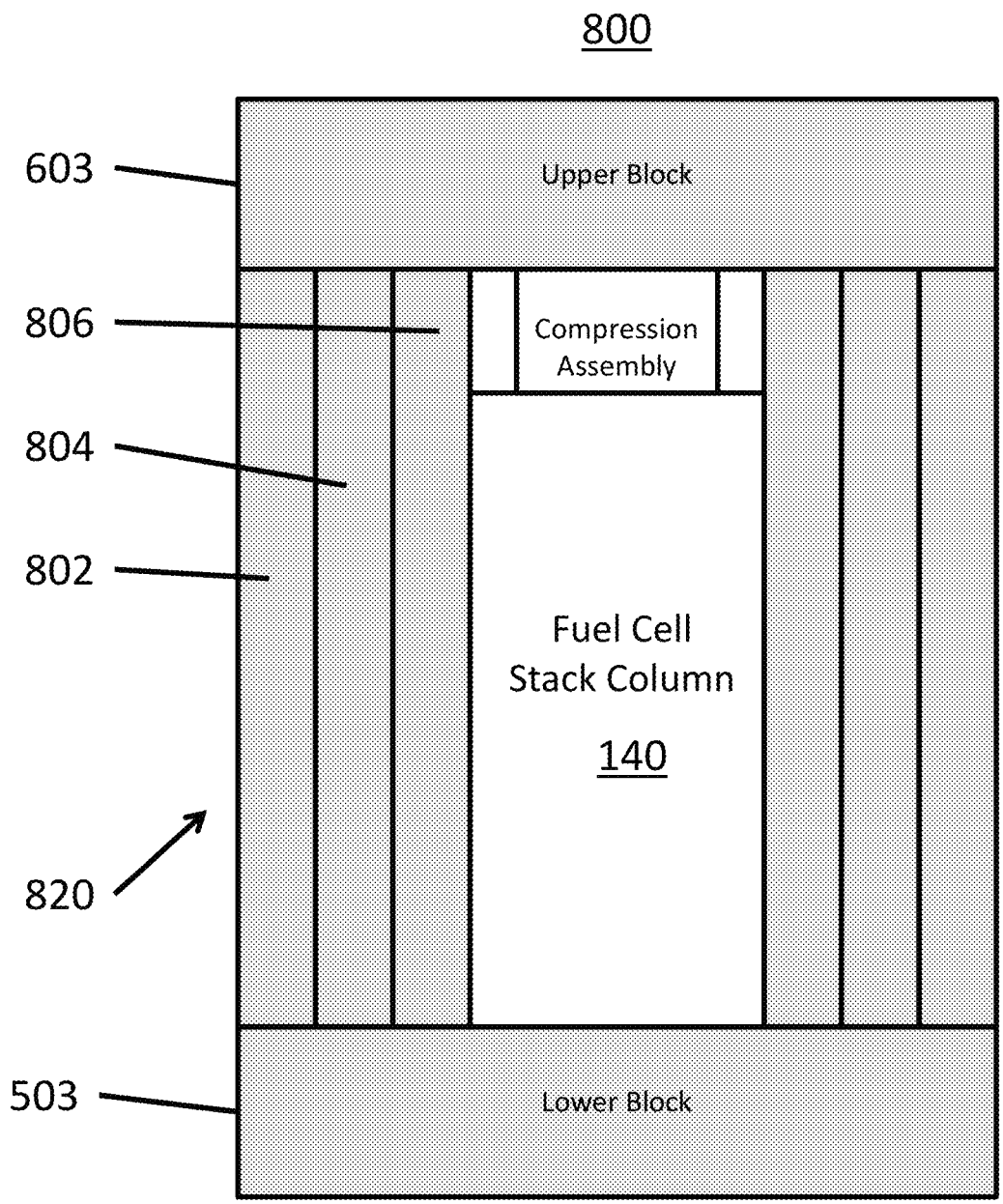
FIG. 8 is a schematic front view of a fuel cell stack assembly according to an exemplary embodiment of the present disclosure.

FIG. 8 is a schematic view of a fuel cell stack assembly 800 according to various embodiments of the present disclosure. Referring to FIG. 8, the fuel cell stack assembly 800 includes an upper block 603, a lower block 503, a fuel cell stack column 140, and side baffles 820. The side baffles 820 each include a first plate 802, a second plate 804, and a third plate 806, which may include ceramic materials. The plates 802, 804, 806 may be formed of the same material and may have substantially the same size and shape. The plates 802, 804, 806 may be laminated to one another, such that the side baffles 820 have a laminate structure. However, according to some embodiments, the plates 802, 804, 806 may include different materials and/or have different properties. While three plates are shown in FIG. 16, the present disclosure is not limited to any particular number of plates. The plates 802, 804, 806 may be laminated to one another in a horizontal direction that is perpendicular to a stacking direction of fuel cells of the fuel cell stack column 140.

For example, the third plate 806, which is closest to the fuel cell stack column 140, may have a higher dielectric strength than the first and second plates 802, 804 disposed further from the fuel cell stack column 140. The first plate 802 and or the second plate 804 may have higher strength and/or rigidity than the third plate 806. As such, each plate may be configured to impart specific features to the side baffle 820. For example, one of the plates 802, 804, 806 may be formed of a material having a relatively higher thermal conductivity than other plate(s). However, the present disclosure is not limited to the specific compositions and/or characteristics, which may be altered according to specific applications and requirements.

With regard to flow channels, ceramic components, such as side baffles, having a laminate structure can be configured such that certain layers form an internal manifold or channel (s). Such a structure may be used to deliver fuel to a fuel cell stack column, which can eliminate or simplify existing fuel rails 214. Further, such an internal manifold could also be configured to direct air into and/or around the fuel cell stack column to improve temperature change characteristics of the fuel cell stack column. Accordingly, such structures may operate as air and/or fuel manifolds.

Manifolds or channels may be formed in a laminate ceramic component by forming holes in individual ceramic layers, and then connecting the layers such that the holes are aligned to form a manifold or channel. In the alternative, one of the layers may be formed of ceramic strips, with areas between the strips forming a manifold or channel(s), in conjunction with other layers disposed on opposing sides of the strips.

Figure 9:
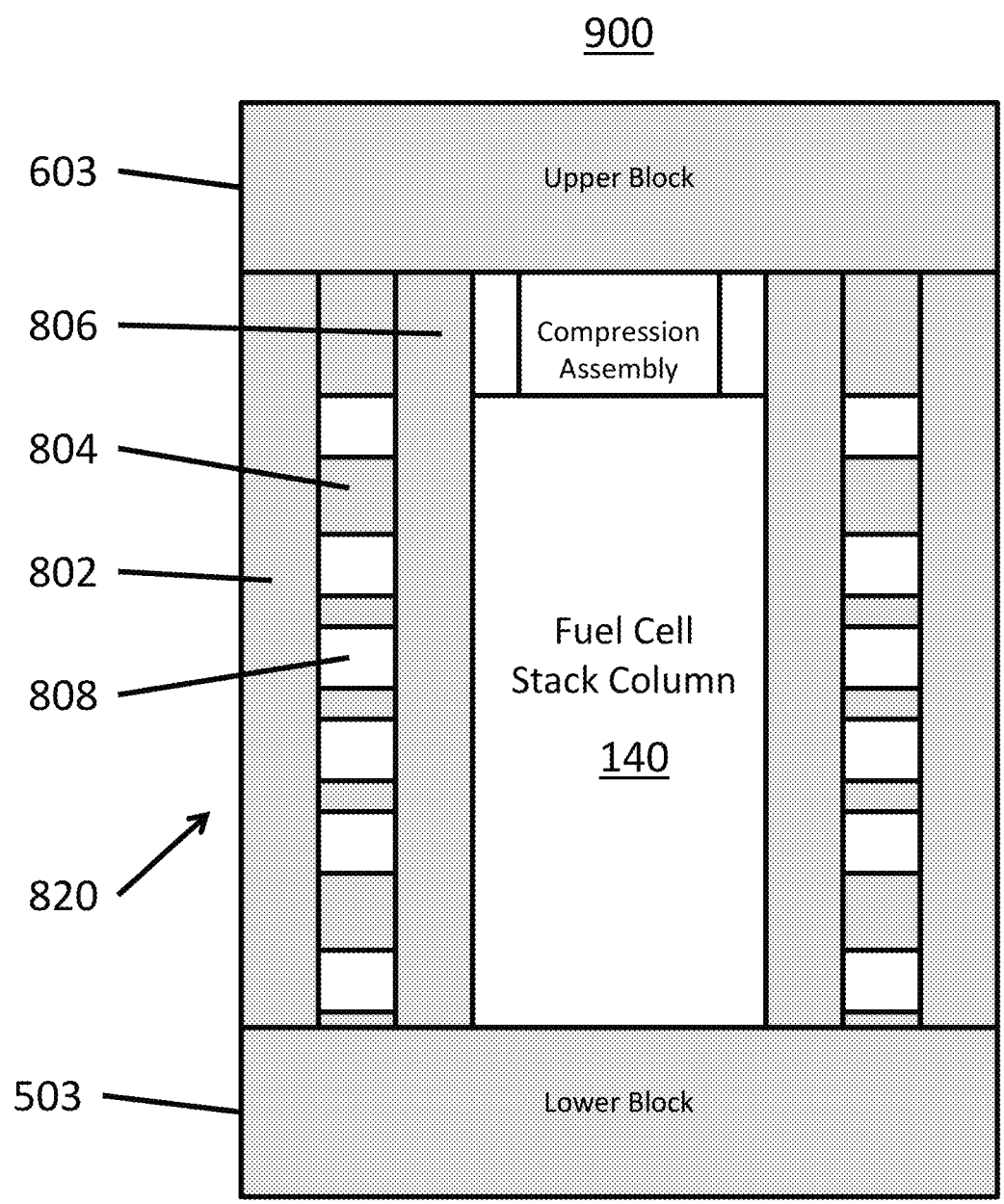
FIG. 9 is a schematic front view of a modified version of the fuel cell stack assembly of FIG. 8.

FIG. 9 is a schematic view of a fuel cell stack assembly 900 according to various embodiments of the present disclosure. The fuel cell stack assembly 900 is similar to the assembly 800 of FIG. 8, so only the differences therebetween will be discussed in detail.

Referring to FIG. 9, the fuel cell stack assembly 900 includes side baffles 820. However, in contrast to FIG. 8, the second plate 804 at least partially defines channels 808 that extend through the side baffle 820. The channels 808 may extend in across the fuel cell stack column 140 in a widthwise direction (i.e., the channels 808 may extend horizontally (into or out of the page) in a direction perpendicular to a lengthwise direction (vertical stacking direction) of the fuel cell stack column). The channels 808 may be configured to allow air to flow through the side baffles 820, and thereby cool the fuel cell stack column 140. As such, the channels 808 may be referred to as "air channels".

The channels 808 may be equally spaced apart. However, according to some embodiments, the second plate 804 may include a higher density of the channels 808 in areas that receive more heat. For example, the second plate 804 may include more channels 808 in areas adjacent to the center of the fuel cell stack column 140 than at areas adjacent to ends (e.g., top and bottom) of the fuel cell stack column 140, which tend to be cooler than the center of the stack column 140. According to some embodiments, the second plate 804 may be formed of ceramic strips that at least partially define the channels 808.

According to some embodiments, a method of providing air to the stack assembly 900 is provided. In particular, air is blown horizontally into the stack assembly (i.e., into the page) into an open face of the stack column 140 and into channels 808. A portion of the air fed into the stack 14 is used as an oxidizer in an electrochemical power generation reaction, while a portion of the air is fed through the channels 808 to cool the stack column 140.

Figure 10:
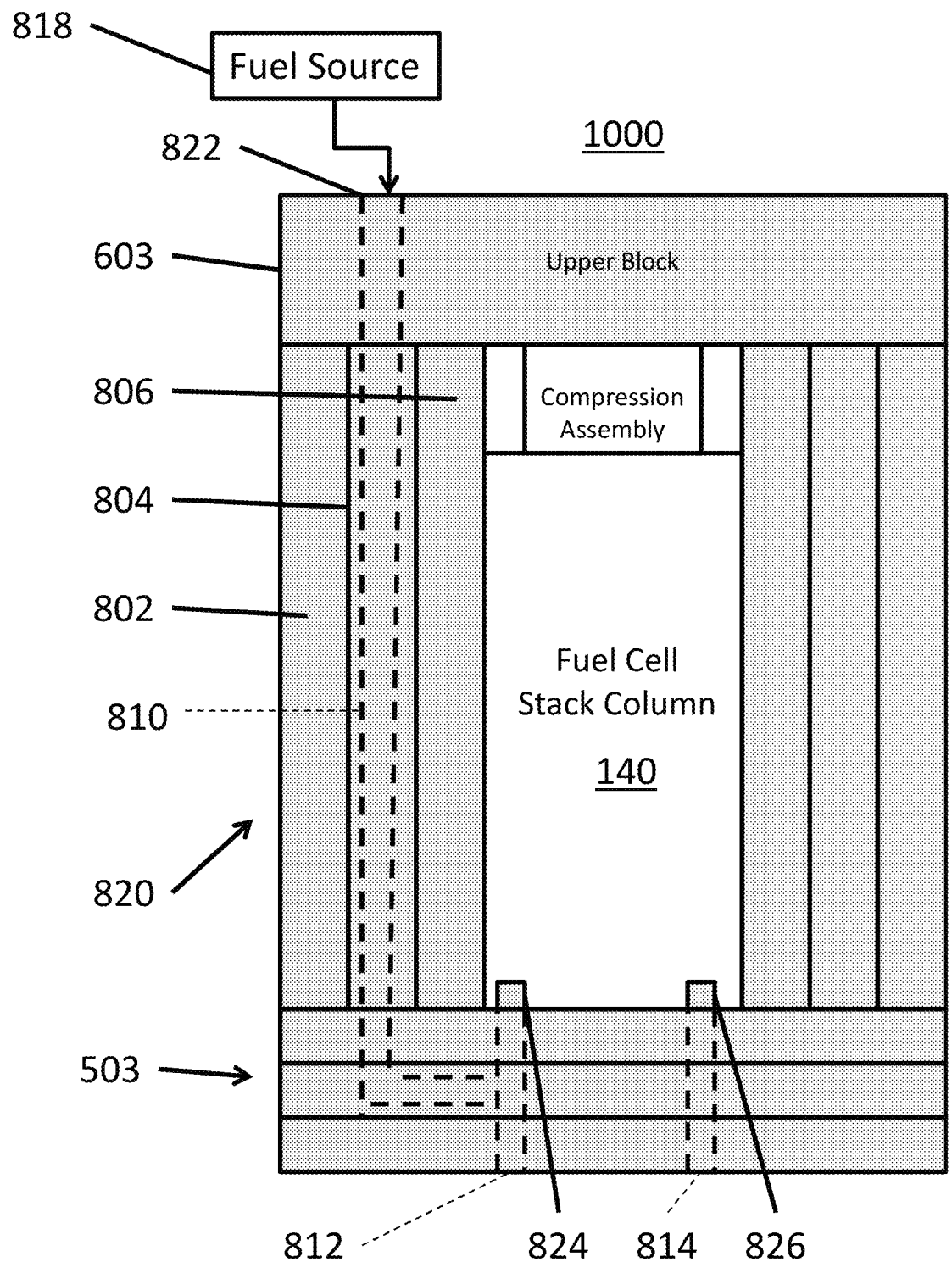
FIG. 10 is a schematic front view of another modified version of the fuel cell stack assembly of FIG. 8.

FIG. 10 is a schematic view of a fuel cell stack assembly 1000 according to various embodiments of the present disclosure. The fuel cell stack assembly 1000 is similar to the assembly 800 of FIG. 8, so only the differences therebetween will be discussed in detail. Referring to FIG. 10, the fuel cell stack assembly 1000 includes a lower block 503 having a layered structure. In particular, the lower block 503 includes an inlet manifold 812 and an outlet manifold 814. The inlet manifold 812 may operate to supply fuel to the fuel cell stack column 140. The outlet manifold 814 may operate to receive reaction products from the fuel cell stack column 140. The laminate structure of the lower block 503 facilitates the formation of manifolds, since it may be easier to form manifold structures in the thinner individual layers of the laminate structure, before assembling the layers together and forming a manifold.

The fuel cell stack assembly 1000 may also include a fuel channel 810 that extends through the side baffle 820 and lower block 503. In some embodiments, the fuel channel 810 may also optionally extend through the upper block 603. An opening 822 of the fuel channel 810 may be connected to a fuel source 818. The fuel source 818 may be a natural gas pipeline, a fuel storage vessel, such as hydrogen or hydrocarbon fuel tank, or any other suitable source of fuel. The fuel channel 810 may be configured to reform a fuel e.g., to act as a fuel reformer or pre-reformer. For example, the fuel channel 810 may include a fuel reformation catalyst. The catalyst may be any suitable catalyst, such as a nickel/rhodium, for example. Suitable catalysts are disclosed in U.S. Pat. Nos. 8,563,180 and 8,057,944, which are incorporated herein, in their entireties, by reference. The catalyst may be coated on the inner surface of the fuel channel 810 or may be disposed within the fuel channel 810.

The fuel channel 810 may be connected to the inlet manifold 812. The inlet manifold 812 may be connected to a fuel inlet 824 of the fuel cell stack column 140. In particular, the fuel channel 810 may extend through an inner layer of the lower block 503. However, in other embodiments, the fuel channel may extend to a lower surface of the lower block 503. The lower block 503 may also include a fuel outlet 826 of the fuel cell stack column 140.

Figure 11:
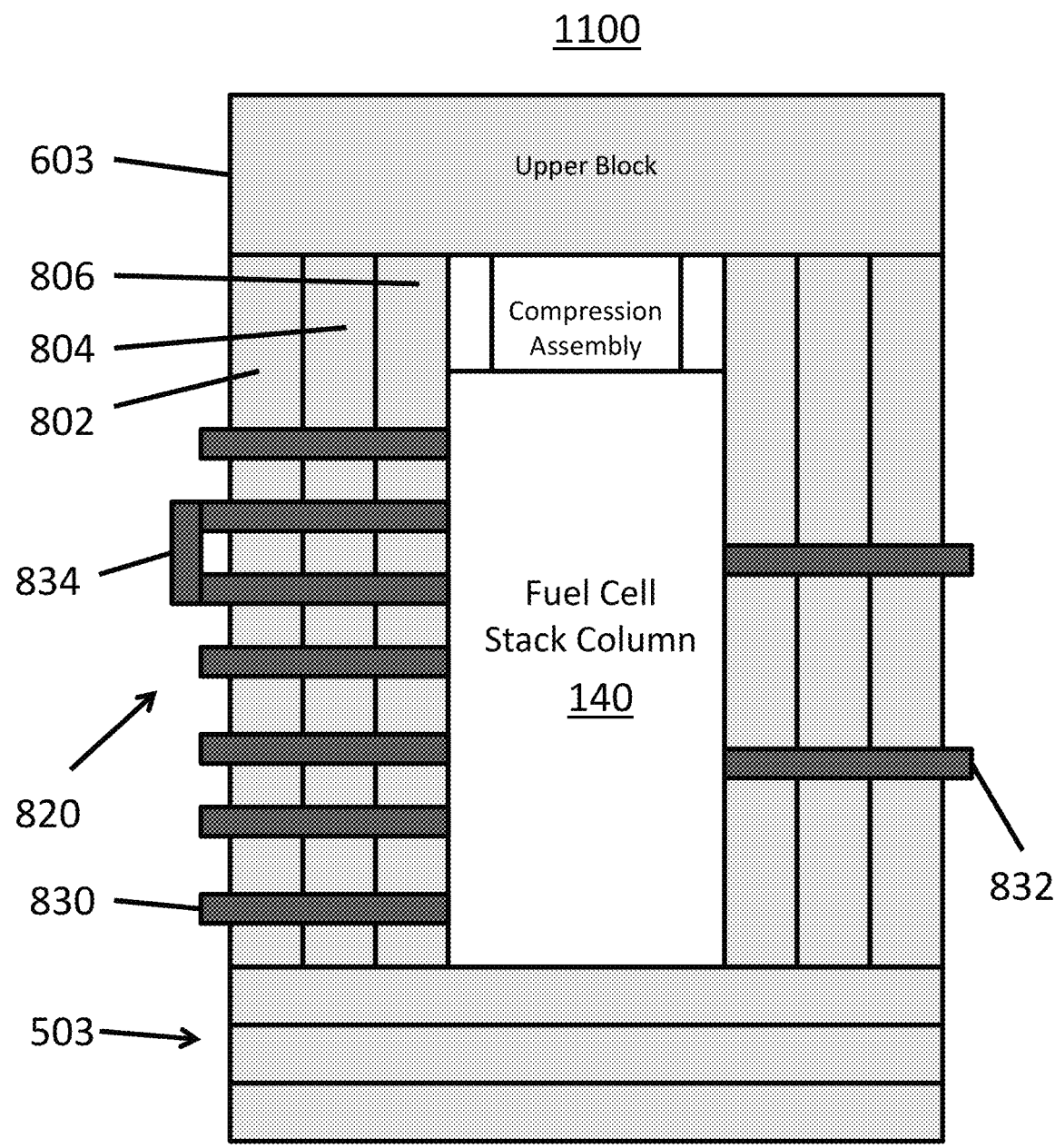
FIG. 11 is a cross-sectional schematic front view of another modified version of the fuel cell stack assembly of FIG. 8, taken through a plane in which bypass electrodes and sensors extend.

FIG. 11 is a schematic sectional view of a fuel cell stack assembly 1100, taken through a plane in which bypass electrodes and sensors extend, according to various embodiments of the present disclosure. The fuel cell stack assembly 1100 is similar to the assembly 800 of FIG. 8, so only the differences therebetween will be discussed in detail.

Referring to FIG. 11, side baffles 820 of the fuel cell stack assembly 1100 include bypass electrodes 830 extending there through. The bypass electrodes 830 may be connected to individual interconnects of the fuel cell stack column 140. For example, a bypass electrode 830 may be included (e.g., embedded in the side baffle 820) for each interconnect of the fuel cell stack column 140. Accordingly, the bypass electrodes 830 can be electrically connected to one another, so as to electrically bypass selected fuel cells. As such, the bypass electrodes 830 allow the fuel cell stack column 140 to continue operating, in the case where one or more fuel cells operate improperly or are damaged. The bypass electrodes 830 can be connected by, for example, using an external connector 834. However, any suitable connection device or method may be used.

According to an alternative embodiment, rather than embedding the bypass electrodes 830 into the side baffle 820, the side baffle may contain openings (e.g., vertically stacked, horizontally extending through holes) which expose the side edges of the respective interconnects in the fuel cell stack column 140. If a defective fuel cell is detected in the stack, then the electrically connected bypass electrodes 830 are inserted into openings in the side baffles 820. The bypass electrodes 830 are connected by a connector 834 and contact the respective side edges of the interconnects located above and below the defective fuel cell in the stack.

The side baffles 820 may also include sensors 832. The sensors 832 may extend through a side baffle 820 and contact the fuel cell stack column 140. The sensors 832 may be imbedded in channels in a side baffle 820. The sensors 832 may be temperature sensors (thermocouples), pressure sensors, electrical sensors, e.g., lead wires for a current or voltage sensor, or the like.

Figure 12A:
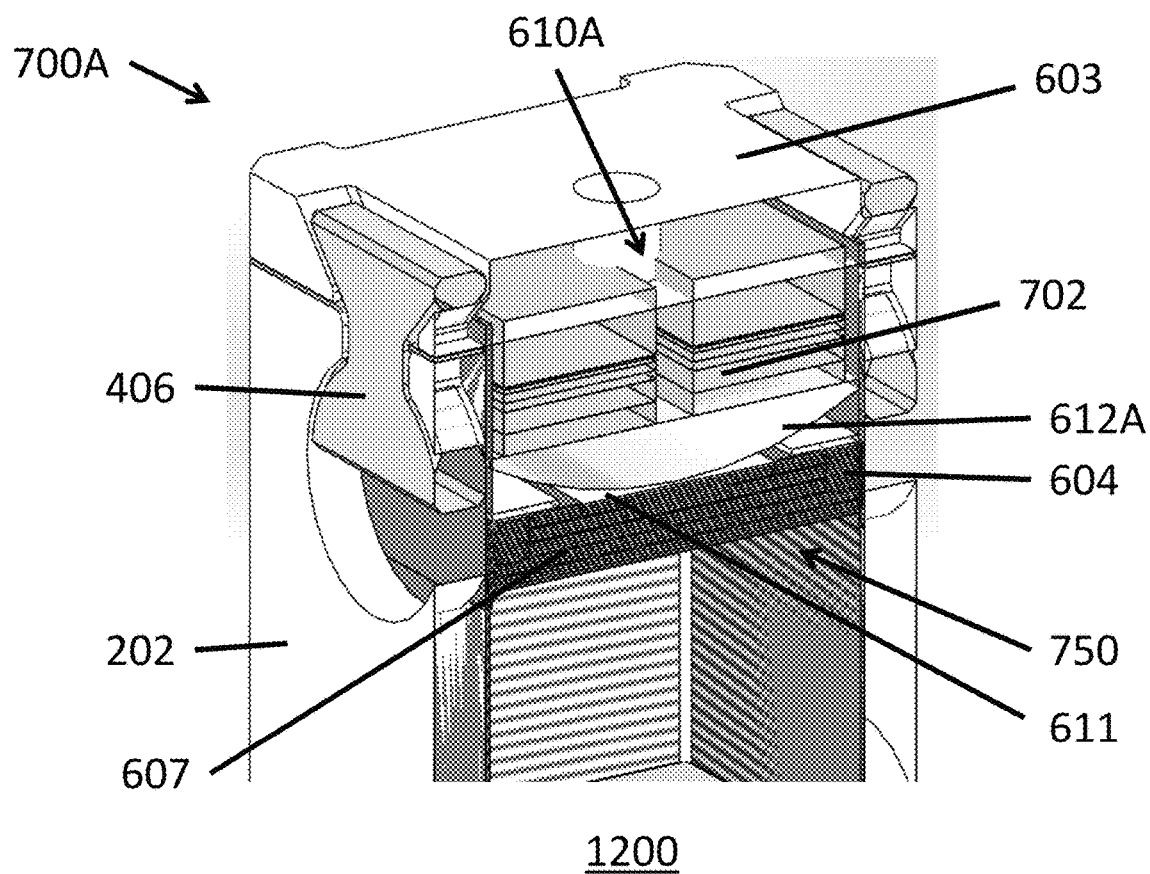
FIG. 12A illustrates a perspective view of a portion of a fuel cell stack assembly, according to various embodiments of the present disclosure.
Figure 12B:
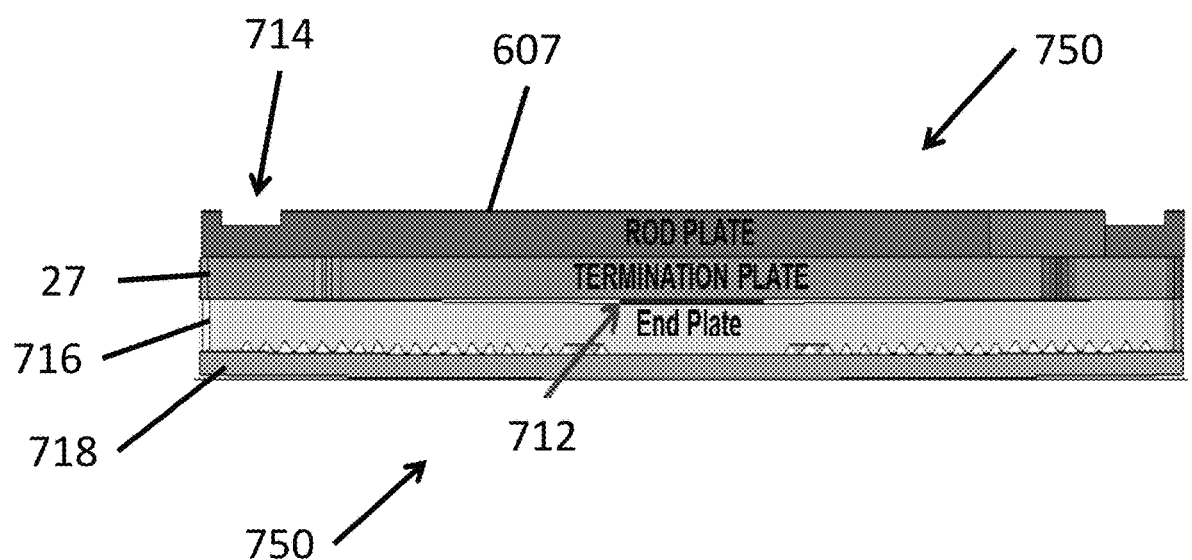
FIG. 12B illustrates a side view of an upper plate assembly of the fuel cell stack assembly of FIG. 12A.
Figure 13:
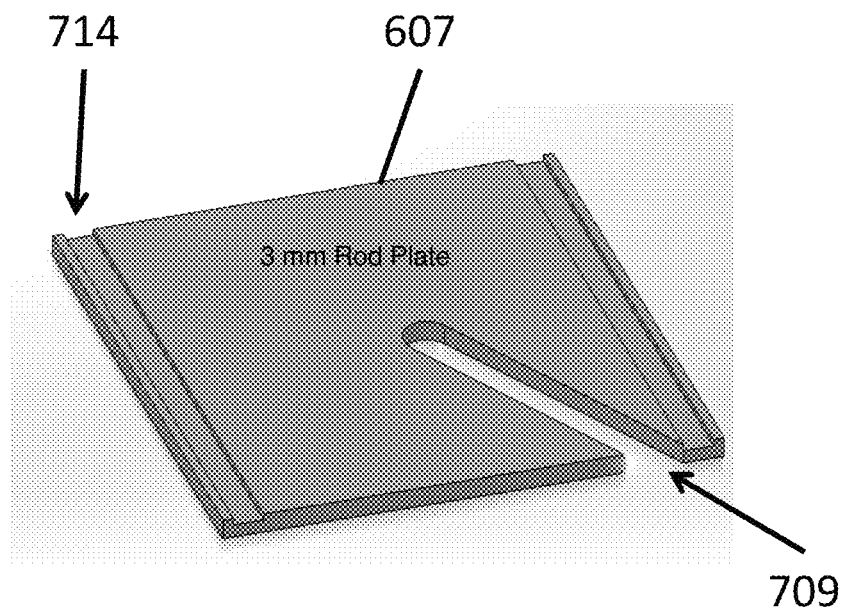
FIG. 13 illustrates a perspective view of a rod plate of the upper plate assembly of FIG. 12B.

FIG. 12A illustrates a perspective view of a portion of a fuel cell stack assembly 1200 (with the fuel cell stack column shown transparently for clarity), according to various embodiments of the present disclosure. FIG. 12B illustrates a side view of an upper plate assembly 750 of the fuel cell stack assembly 1200. FIG. 13 illustrates a perspective view of a rod plate 607 of the upper plate assembly 750. The fuel cell stack assembly 1200 includes elements similar to the fuel cell stack assemblies described above, so only the differences therebetween will be described in detail.

Referring to FIGS. 12A, 12B, and 13, the fuel cell stack assembly 1200 includes side baffles 202 connected to a compression assembly 700A that is similar to the compression assembly 600A, and is disposed on the upper plate assembly 750. The compression assembly 700A includes a leaf spring 611 and support rods 604, and is disposed on the upper plate assembly 750. The upper plate assembly 750 includes a rod plate 607, a column termination plate 27, and an interface seal 712. The termination plate 27 is disposed on an end plate 716 of an uppermost a fuel cell of a fuel cell stack column of the assembly 1200. The termination plate 27 includes a column electrical contact (not shown). The end plate 716 is disposed on an uppermost electrolyte plate 718 of the column.

The rod plate 607 includes grooves 714 in which the support rods 604 are disposed. The rod plate 607 may also include a thermocouple slot 709. A thermocouple may be inserted into the slot 709 to measure column temperature. The rod plate 607 may be formed of alumina or a similar ceramic material. The rod plate 607 may have a thickness of at least 1 mm. For example, the rod plate 607 may have a thickness ranging from about 1 mm to about 5 mm, or about 2 mm to about 4 mm, such as a thickness of about 3 mm.

The support rods 604 are configured to support the spring 611. The spring 611 is configured to apply pressure to the column, via the support rods 604, the rod plate 607, and the termination plate 27. The interface seal 712 is an annular seal disposed between the end plate 716 and the termination plate 27, and is configured to prevent fuel in a fuel riser opening in the end plate 716 from flowing between the end plate 716 and the termination plate 27. The interface seal 712 may be formed of a glassy material. The interface seal 712 may flow at a temperature of at least 650° C., such as a temperature ranging from 675° C. to 725° C., or 685° C. to 715° C. For example, the interface seal may flow at a temperature of about 700° C.

Due to the nature of materials used in the stack assembly 1200, the load during first heat up of the stack increases to as high as 850 lbs, until the interface seal 712 disposed around a fuel riser opening in the end plate 716 flows and spreads out before setting. This load increases the bending stresses of rod plate 607, which may cause it to break. This results in disturbing the load distribution in the stack, which may lead to a loss of contact between the end plate 716 and the termination plate 27, leading to a loss or flickering of column voltage and/or a fuel leak at the top of the column.

Figure 14A:
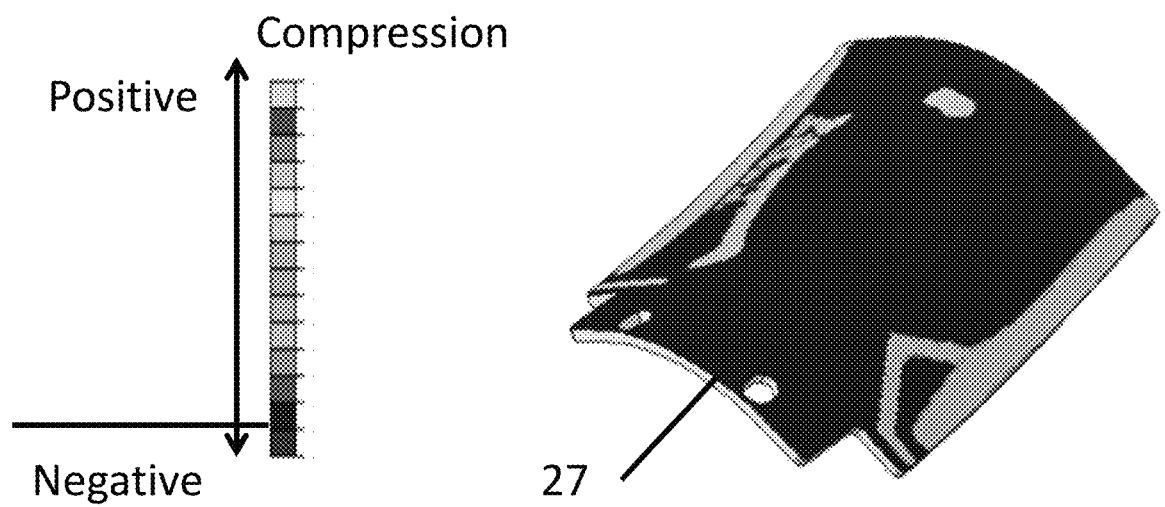
FIG. 14A is a finite element model (FEM) showing load distribution on a termination plate during maximum loading.
Figure 14B:
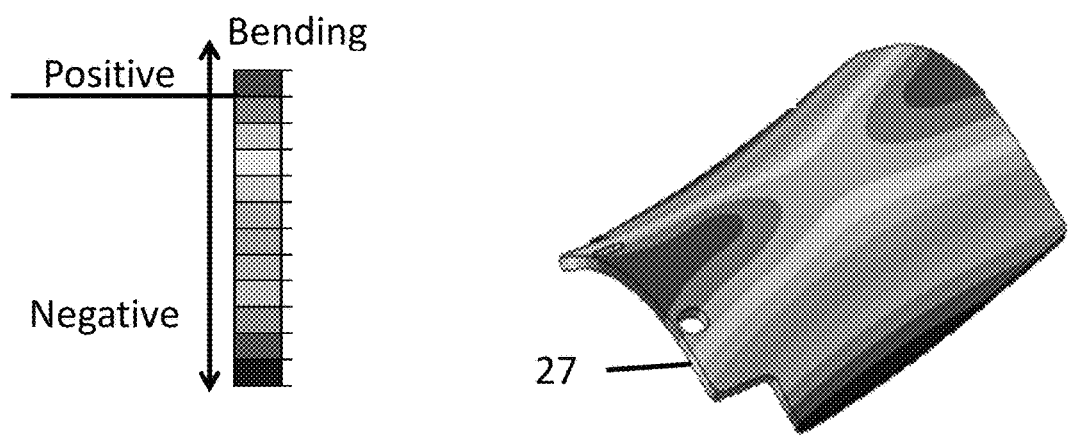
FIG. 14B is a FEM showing vertical deflections of a termination plate during maximum loading.
Figure 14C:
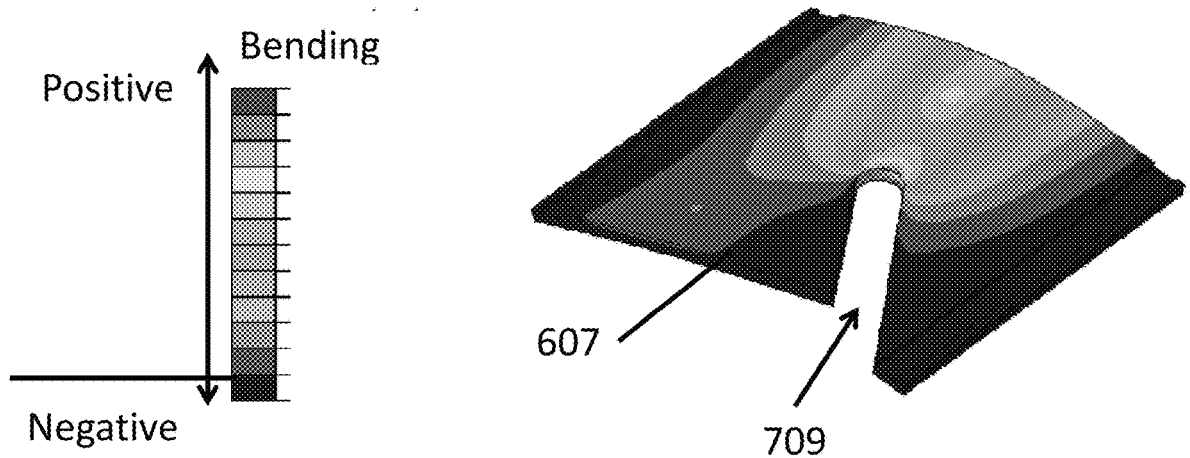
FIG. 14C is a FEM showing stress applied to a rod plate during maximum loading.

FIG. 14A a finite element model (FEM) showing load distribution on the termination plate 27 during maximum loading in the upper plate assembly 750, i.e., when a maximum load is applied thereto during initial fuel cell system startup. FIG. 14B is a FEM showing vertical deflections of the termination plate 27 during maximum loading. FIG. 14C a FEM showing stress applied to the rod plate 607 during maximum loading.

Referring to FIGS. 14A and 14B, loading is shown to be concentrated around edges of the termination plate 27, which results in the termination plate 27 bending by over 200 μm. As such, the termination plate 27 may lose contact with the end plate 716, which may result in voltage loss.

Referring to FIG. 14C, stress is shown to be concentrated at an end of a thermocouple slot 709 formed in the rod plate 607. In particular, a maximum stress applied to the rod plate 607 may be very close to breaking strength of alumina which forms the rod plate 607. As such, the stress may result in fracturing of the rod plate 607.

Figure 15:
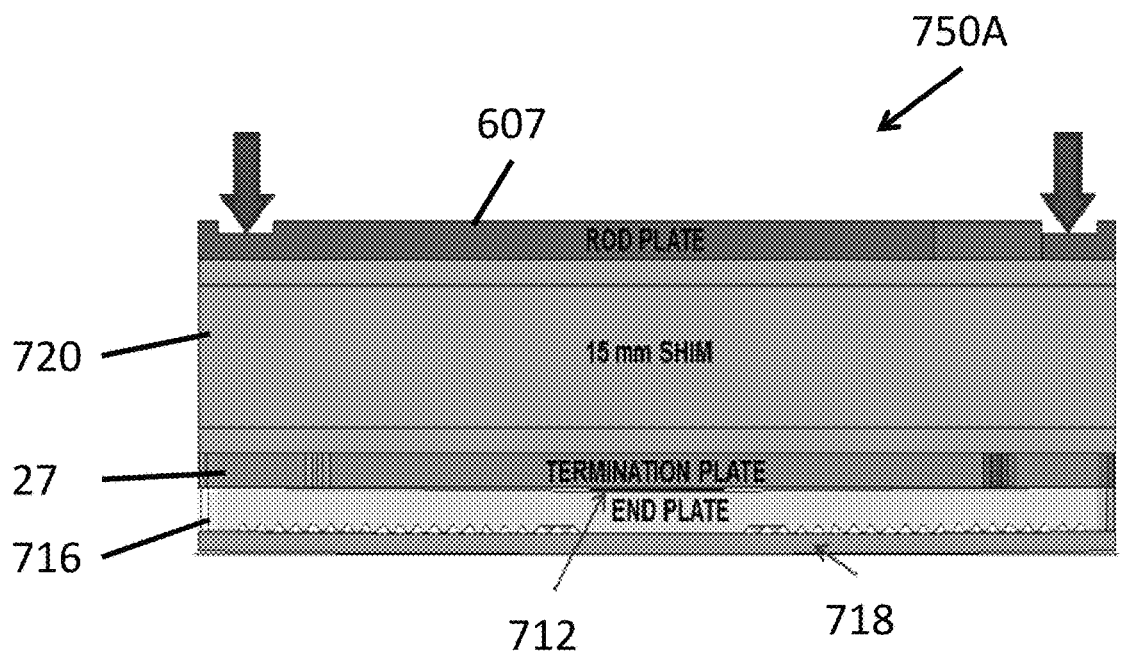
FIG. 15 is a sectional view of an upper plate assembly according to various embodiments of the present disclosure.

FIG. 15 is a sectional view of an upper plate assembly 750A according to various embodiments of the present disclosure. The upper plate assembly 750A is similar to the upper plate assembly 750, so only the differences therebetween will be described in detail.

Referring to FIG. 15, the upper plate assembly 750A includes a rod plate 607, a termination plate 27, and an interface seal 712. The termination plate 27 is disposed on an end plate 716 of an uppermost fuel cell of a fuel cell stack column. The end plate 716 is disposed on an electrolyte plate 718 of the uppermost fuel cell of the column. The upper plate assembly 750A also includes a shim 720 disposed between the rod plate 607 and the termination plate 27.

The shim 720 may be formed of a ceramic or cermet material. The shim 720 may have a thickness of at least about 10 mm. For example, the shim 720 may have a thickness ranging from about 10 mm to about 40 mm, from about 12 mm to about 20 mm, or from about 14 mm to about 16 mm. The shim 720 may have a thickness of about 15 mm, according to some embodiments. The shim 720 may be configured to support the rod plate 607, such that the bending stress (shown by arrows) applied to the rod plate 607 is reduced.

Figure 16A:
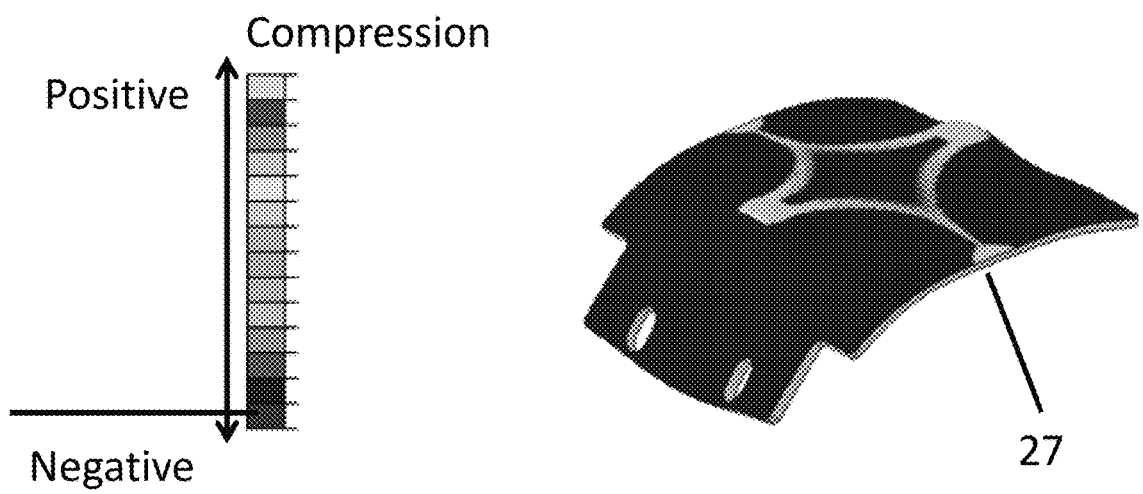
FIG. 16A is a FEM showing load distribution on a termination plate during maximum loading.
Figure 16B:
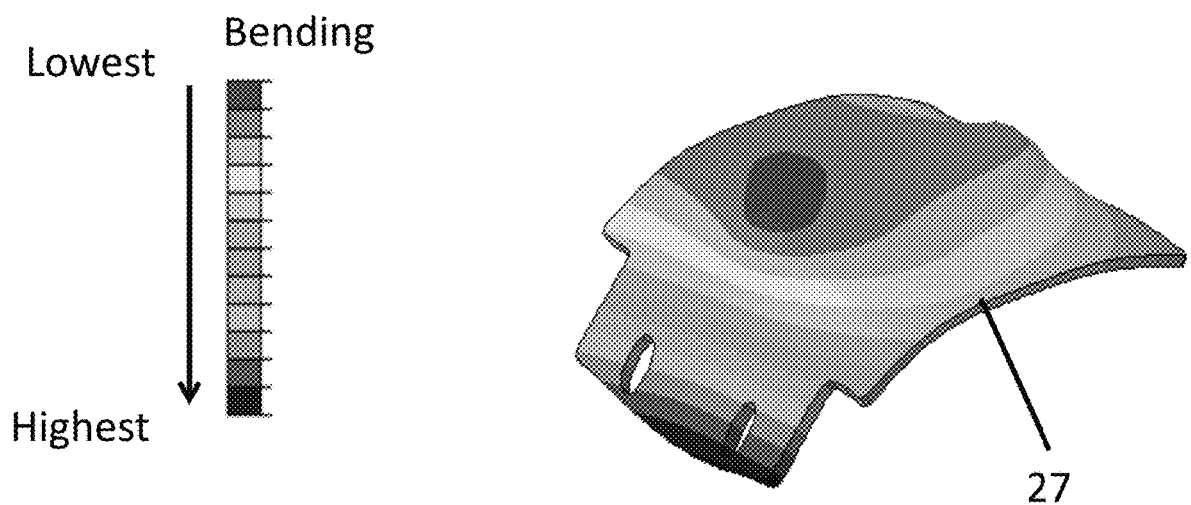
FIG. 16B is a FEM showing vertical deflections of a termination plate during maximum loading.

FIG. 16A is a FEM showing load distribution on the termination plate 27 during maximum loading in the upper plate assembly 750A. FIG. 16B a FEM showing vertical deflections of the termination plate 27 during maximum loading of the upper plate assembly 750A.

Referring to FIGS. 16A and 16B, it can be seen that the shim 720 spreads out the load applied to the termination plate 27. In addition, as shown in FIGS. 14B and 16B, the shim 720 reduces the maximum bending of the termination plate 27 by at least a factor of 10, such as by about 10 to 18 times. Accordingly, it can be seen that the shim 720 reduces the possibility of voltage flickering or loss and rod plate breakage.

Figure 17A:
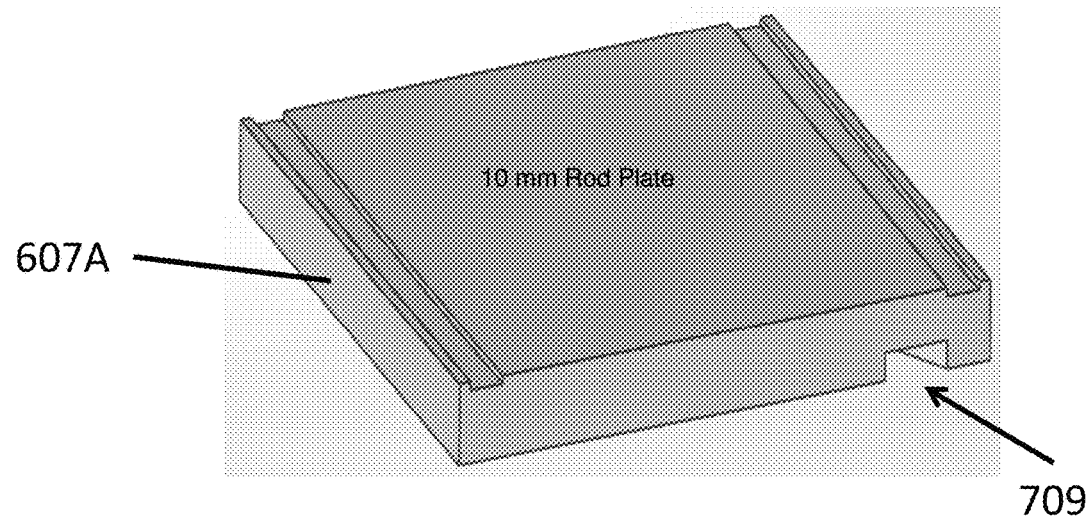
FIG. 17A illustrates a modified rod plate according to various embodiments of the present disclosure.
Figure 17B:
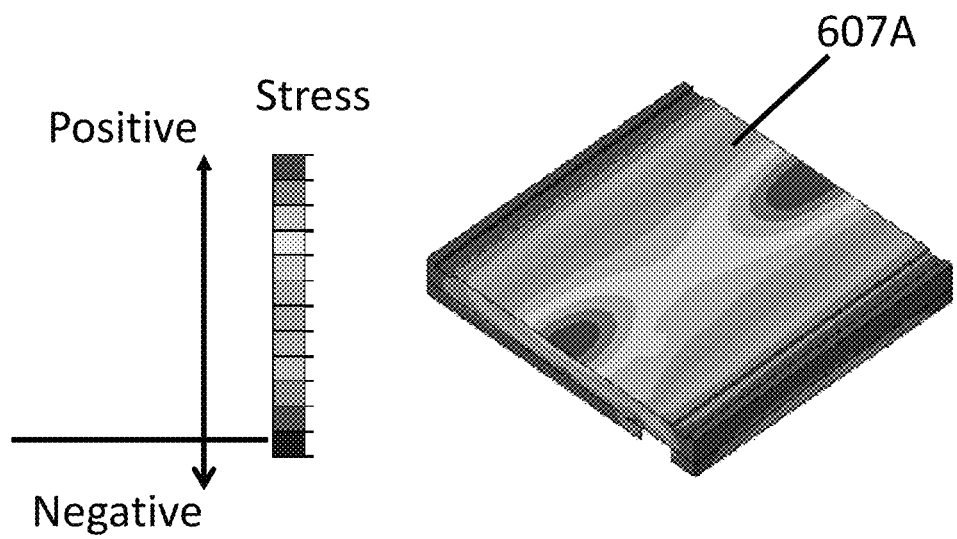
FIG. 17B is a FEM showing load distribution applied to a rod plate during maximum loading.
Figure 17C:
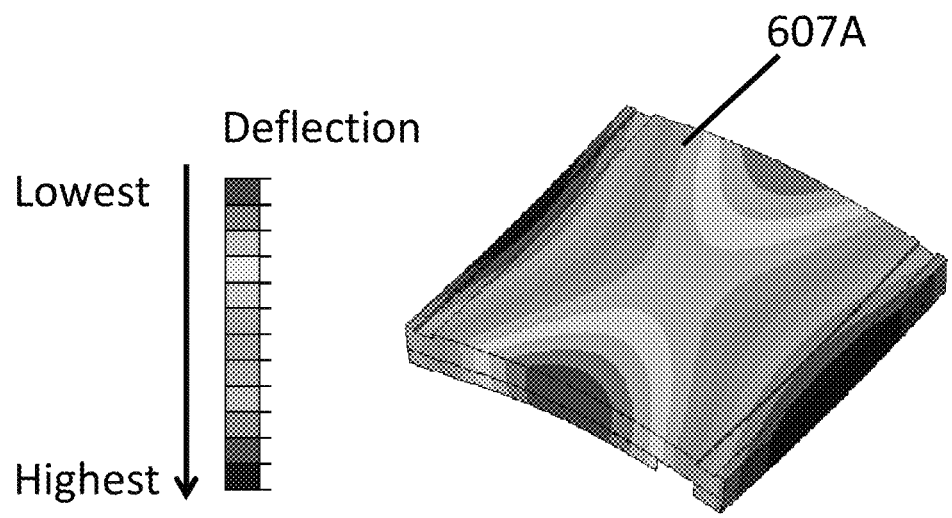
FIG. 17C is a FEM showing bending deflection applied to a rod plate during maximum loading.
Figure 17D:
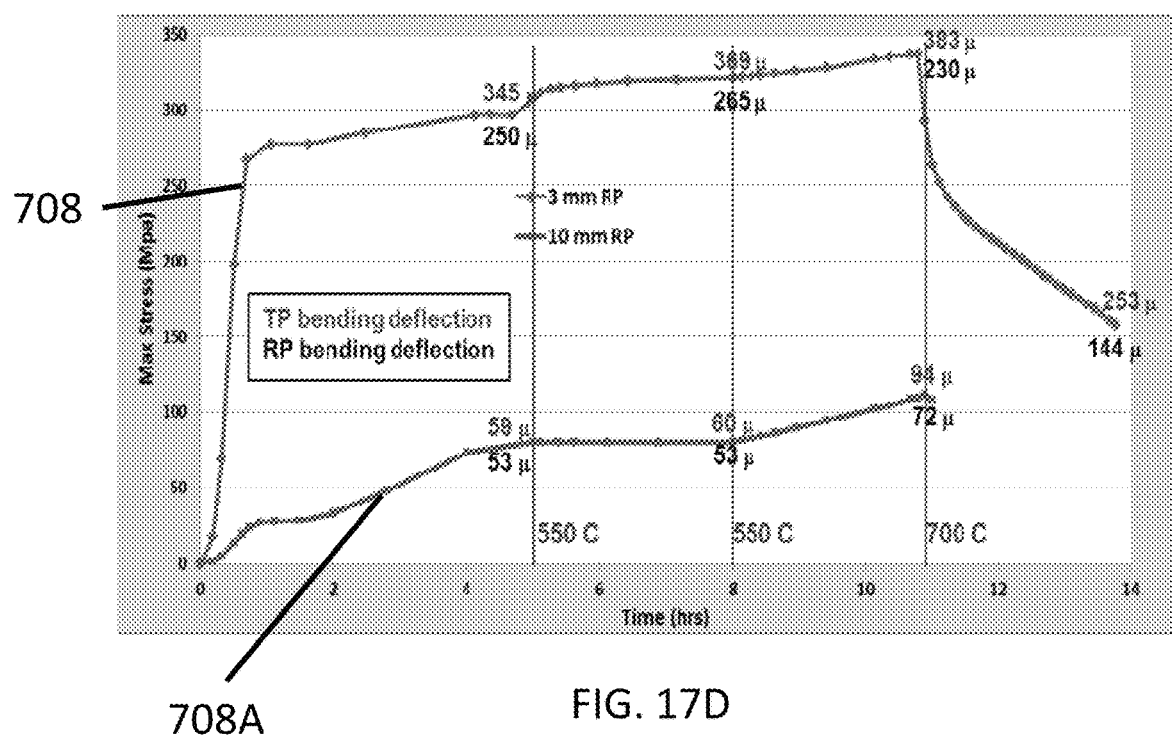
FIG. 17D is a stress vs. time plot comparing maximum stress applied to rod plates and corresponding bending deflections of the rod plates and corresponding termination plates, over time, during initial fuel cell system startup.

FIG. 17A illustrates a modified rod plate 607A according to various embodiments of the present disclosure. FIG. 17B a FEM showing load distribution applied to the rod plate 607A during maximum loading. FIG. 17C a FEM showing bending deflection applied to the rod plate 607A during maximum loading. FIG. 17D is a chart comparing maximum stress applied to the rod plates 607 and 607A, and corresponding bending deflections of the rod plates 607 and 607A and corresponding termination plates 27, over time, during initial fuel cell system startup.

Referring to FIG. 17A the rod plate 607A is similar to the rod plate 607. However, the rod plate 607A has an increased thickness. For example, the rod plate 607A may have a thickness of at least about 8 mm. For example, the rod plate 607A may have a thickness ranging from about 8-13 mm, about 8-12 mm, from about 9-11 mm, or about 10 mm. As such, a thermocouple slot 709 of the rod plate 607A may have a depth that is less than the thickness of the rod plate 607A. In other words, the thermocouple slot 709 may be in the form of a groove formed in a bottom surface of the rod plate 607A rather than a through hole.

Referring to FIGS. 17B-D, the increased thickness of the rod plate 607A, as compared to the rod plate 607, results in a reduction of the maximum stress by a factor of about 3. In addition, the maximum stress does not occur at the end of the thermocouple slot 709. Further, the maximum deflection of the rod plate 607A is reduced by a factor of about three. Thus, the rod plate 607A is shown to provide better bending and stress characteristics, as compared to rod plate 607. In addition, it was determined that, during initial operation of a fuel cell system, a maximum load and stress applied to system components does not exceed the permitted load and stress, when the rod plate 607A is included. According, the rod plate 607A provides for a safe fuel cell system operation during initial turn on.

The termination plate 27 may be made of 446 stainless steel (SS 446) or a Cr/Fe alloy. SS 446 may include by weight, 73% Fe, 23.0%-27.0% Cr, 1.5% Mn, 1.0% Si, 0.25% Ni, 0.20% Ni, 0.20% C, 0.04% P, and 0.03% S. The Cr/Fe alloy may include, by weight, about 94-96% Cr and about 4-6% Fe, such as 95 wt % Cr and 5 wt % Fe, which may be the same material as used in end plates and interconnects in the column 140. However, the present inventors determined that using the Cr/Fe alloy results in a reduction in stress applied to the thermocouple slot 709 and reduced bending of termination plate 27 and rod plate 607, 607A.

Figure 18:
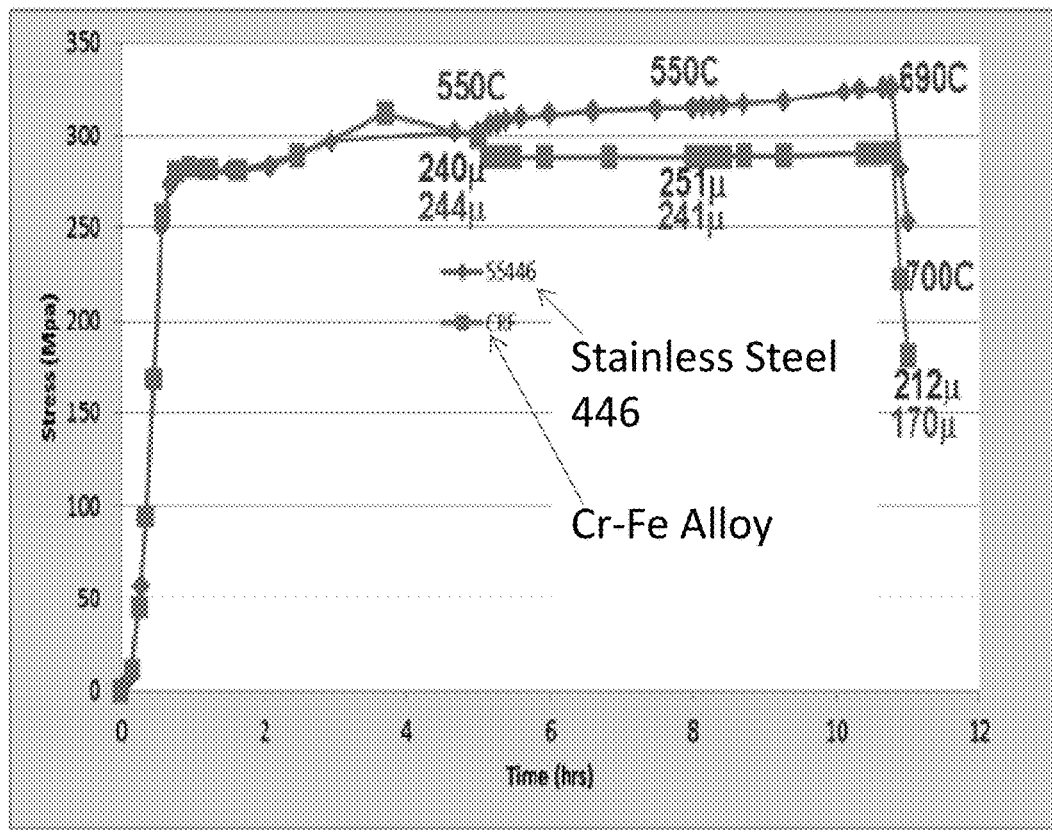
FIG. 18, which is a stress vs. time plot showing stress and deflection test results.

As shown in FIG. 18, the stress applied using the Cr/Fe alloy termination plate 27 is below 300 MPa at a temperature of greater than 550° C., while the stress applied to the SS446 termination plate 27 is greater than 300 MPa between 550 and 690° C. Likewise, the Cr/Fe alloy termination plate 27 deflection is lower than that of the SS446 termination plate 27 at the same temperature.

The present inventors realized that CMC joints are more fragile than desired because the composite is typically not fully dense. The lack of full density frequently leads to early failure of CMC parts due to stress concentrations and fiber spreading and/or matrix cracking. Further, holes in CMC components are especially challenging when bearing a load. This is because holes act as stress concentrators. However, components with holes are desirable for ease of assembly.

The inventors have discovered that by joining at least one denser ceramic element to the CMC component, sufficient joint strength may be provided to the CMC components to allow their use for structural assembly applications in fuel cell systems and other end uses. In one aspect, the at least one denser ceramic element has a higher density than the CMC element. Preferably, denser ceramic element is fully dense, while the CMC element is not fully dense. As used herein, "fully dense" refers to a material having at least 95%, such as 96% to 100%, for example 97% to 99% of its theoretical density. In one embodiment, the theoretical density of most ceramic materials can be calculated from the following formula: (molecular weight of ceramic material times number of molecules per unit cell) divided by (volume of unit cell times Avogardo's number). Any suitable denser ceramic material can be used. In one embodiment, the denser ceramic material comprises a denser alumina, such as a fully dense alumina.

Figure 19:
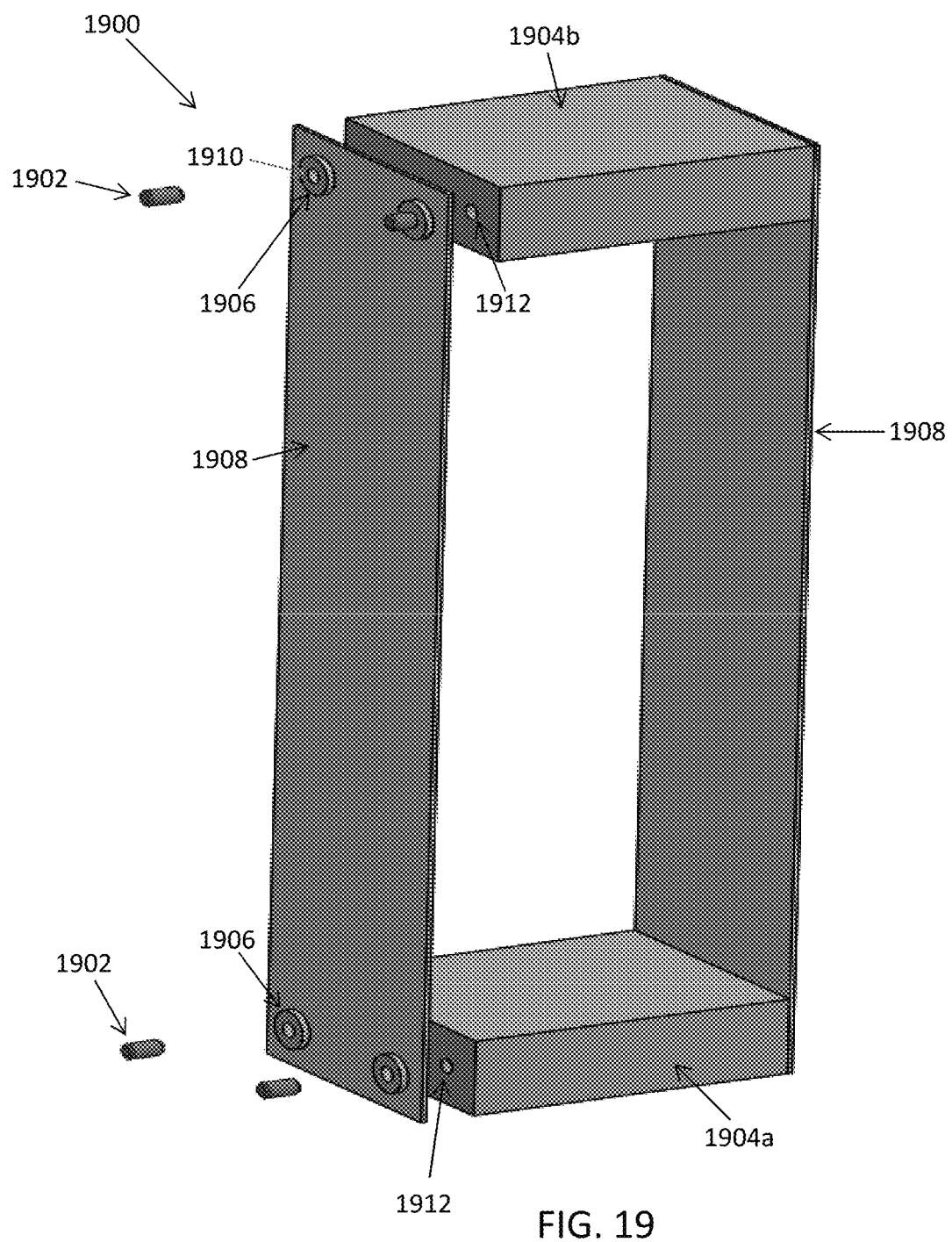
FIG. 19 is a schematic front view of a structural assembly using a ceramic matrix composite CMC panel according to an embodiment.

An embodiment of a structural assembly 1900 using a ceramic matrix composite (CMC) panel 1908 is illustrated in FIG. 19. In this embodiment, the structural assembly 1900 includes a bottom block 1904a and a top block 1904b and a pair of CMC side panels 1908. The side panels may be, but are not limited to, at least portions of the side baffles 220 for a fuel cell column 140 (e.g., for fuel cell stacks 14) as described above in the prior embodiments. In one configuration, the panels 1908 may comprise the baffle plates 202 of the side baffles 220. Holes 1910 in the CMC panels 1908 are aligned with holes 1912 in the bottom block 1904a and the top block 1904b. In this embodiment, the denser ceramic material comprises a washer (e.g., tube) 1906. The holes 1910 in the CMC panel 1908 are reinforced with washers (e.g., tubes) 1906 made of a denser ceramic material, such as a fully dense ceramic material. The structural assembly 1900 is assembled by inserting pins 1902 through the holes in the fully dense ceramic washers 1906, the holes 1910 in the CMC panels 1908 and into the holes 1912 in the bottom and top blocks 1904a, 1904b. The pins 1902 may also be made of the denser ceramic, such as a fully dense ceramic, or from another high temperature resistant material. Thus, in this embodiment, the side baffles 220 disposed on opposing sides of the column are connected to the upper block and the lower block by pins 1902 which extend through holes 1910 in the side baffles 220 into respective holes 1912 in the upper block 1904b and the lower block 1904a.

Figure 20:
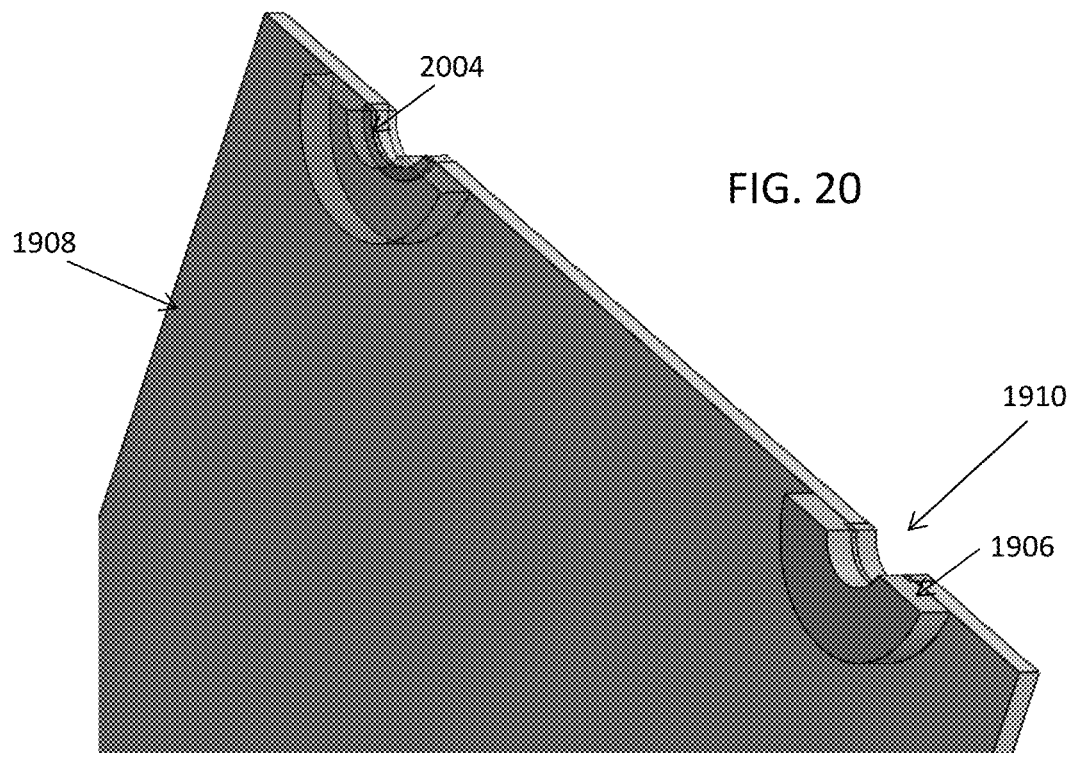
FIG. 20 is a schematic illustration of a CMC panel joined to a dense ceramic element according to an embodiment.

FIG. 20 illustrates an embodiment of a CMC panel 1908 joined to a denser ceramic washer 1906. In this embodiment, the CMC panel 1908 is joined to the denser ceramic washer 1906 by a glass seal 2004 surrounding a periphery of the hole 1910 in the CMC panel 1908. The glass seal 2004 is located between the panel 1908 and the denser ceramic washer 1906. A bond may be formed between the glass seal 2004 and the CMC panel 1908 and the denser ceramic washer 1906 by sintering the glass seal at an elevated temperature. The sintering step may form one or more crystalline phases in the glass seal 2004 (e.g., such that the glass seal comprises a glass—ceramic material). As illustrated, the glass seal 2004 has a smaller area than the fully dense ceramic washers 1906. However, the glass seal 2004 may extend to the full radius of the fully dense ceramic washers 1906.

Figure 21:
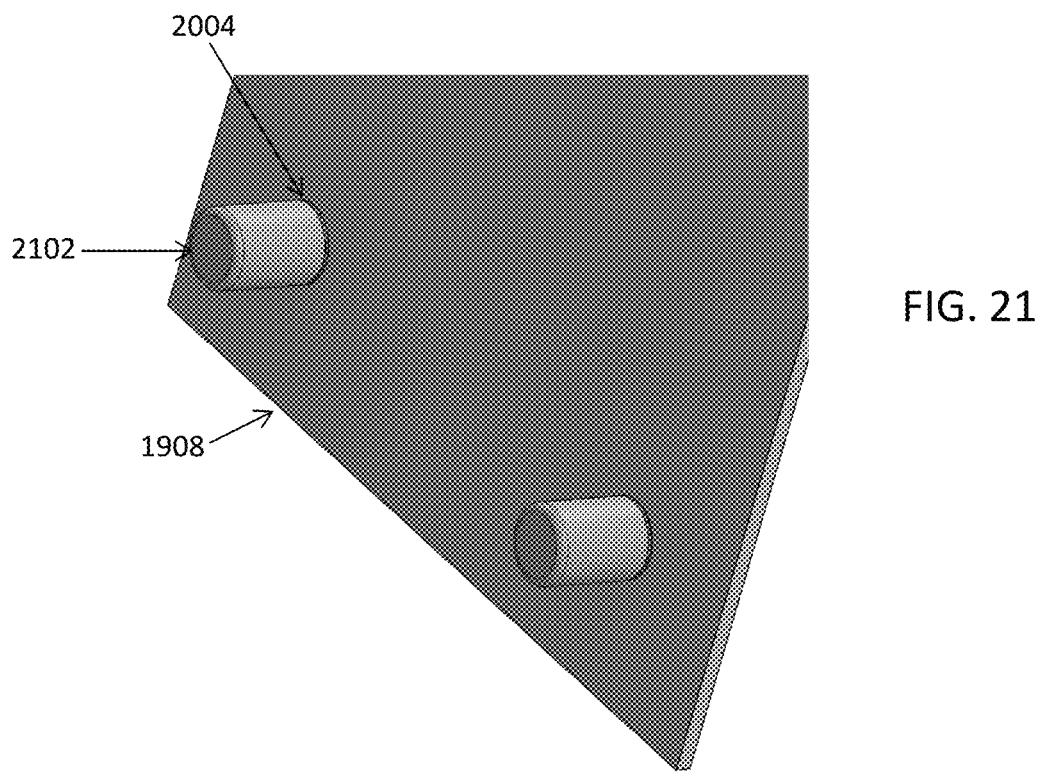
FIG. 21 is a schematic illustration of a CMC panel joined to a dense ceramic element according to another embodiment.

FIG. 21 illustrates another embodiment in which the denser ceramic element is a denser ceramic pin (e.g., peg) 2102, such as a fully dense ceramic pin. As shown in FIG. 21, the CMC panel 1908 is joined to a fully dense ceramic pin 2102. In this embodiment, as in the previous embodiment, the fully dense ceramic pin 2102 may be jointed to the CMC panel 1908 by an optional glass seal 2004. Alternatively or in addition, the pin 2102 may be joined to the panel 1908 by another other suitable method, such as by friction, solid state sintering, mechanical implements, etc. In an embodiment, the fully dense ceramic pin 2102 is sized to fit into the holes 1912 in the bottom and top blocks 1904a, 1904b. Thus, once the fully dense ceramic pins 2102 are sintered to the CMC panel 1908, structural assembly 1900 may be easily fabricated by inserting the fully dense ceramic pins 2102 into the holes 1912 in the bottom and top blocks 1904a, 1904b.

Figure 22:
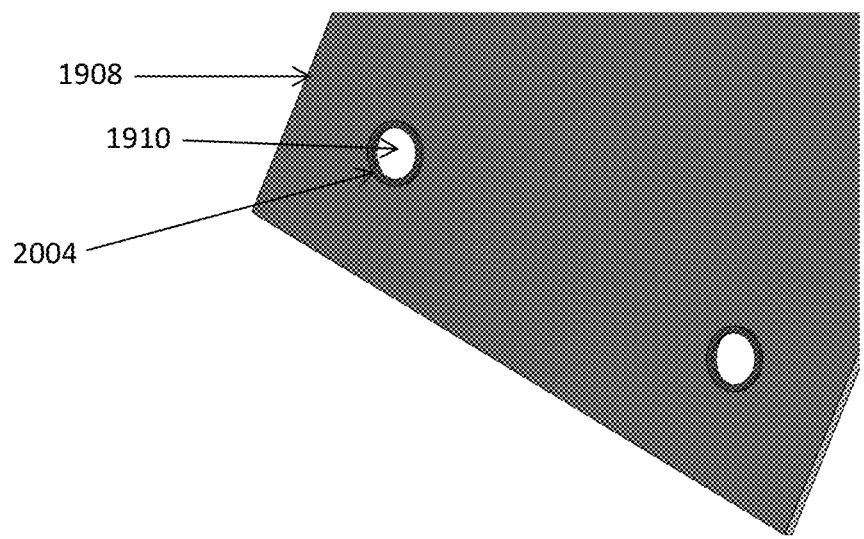
FIG. 22 is a schematic illustration of a CMC panel strengthened with a glass seal according to an embodiment.

FIG. 22 illustrates an embodiment of a CMC panel 1908 having holes 1910 strengthened with a glass seal 2004. In this embodiment, the porous inner edge of the holes 1910 is coated with the glass seal 2004 to prevent fiber separation or matrix cracking due to stress concentration at the holes 1910. Thus, the glass seal 2004 is deposited inside of the hole 1910. In one embodiment, the glass seal 2004 does not extend out of the hole 1910 onto or over a major surface (e.g., flat face) of the CMC panel 1908. The glass seal 2004 may be formed by depositing glass precursor materials the holes 1910 followed by sintering. Sintering may cause formation of one or more crystalline phases in the glass seal 2004 (e.g., such that the glass seal comprises a glass—ceramic material).

Figure 23:
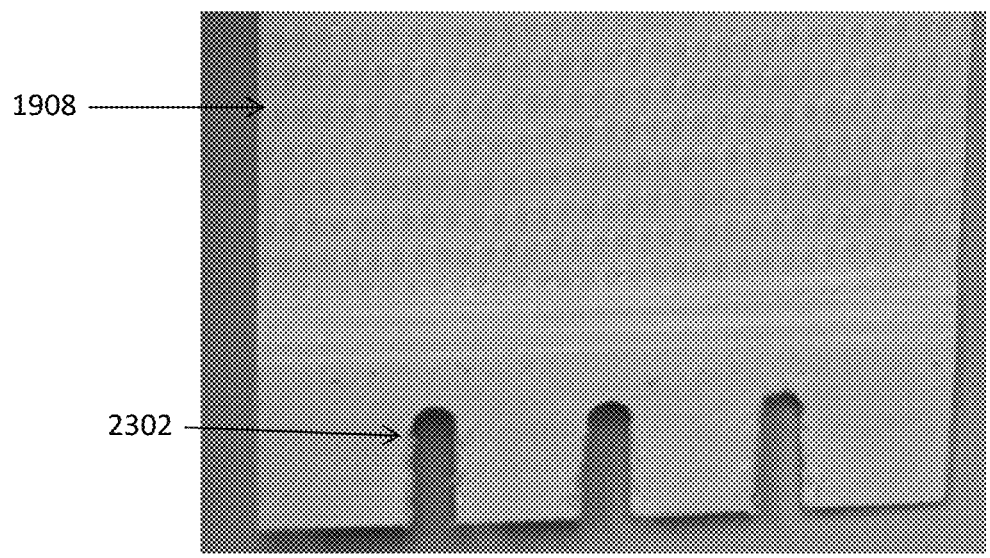
FIG. 23 is a photograph of a conventional CMC panel that has been stressed to failure.

FIG. 23 is a photograph of a conventional CMC panel 1908 that has been stressed to failure. The panel 1908 contains elongated slots 2302 and no denser ceramic element that has been stressed to failure.

Figure 24:
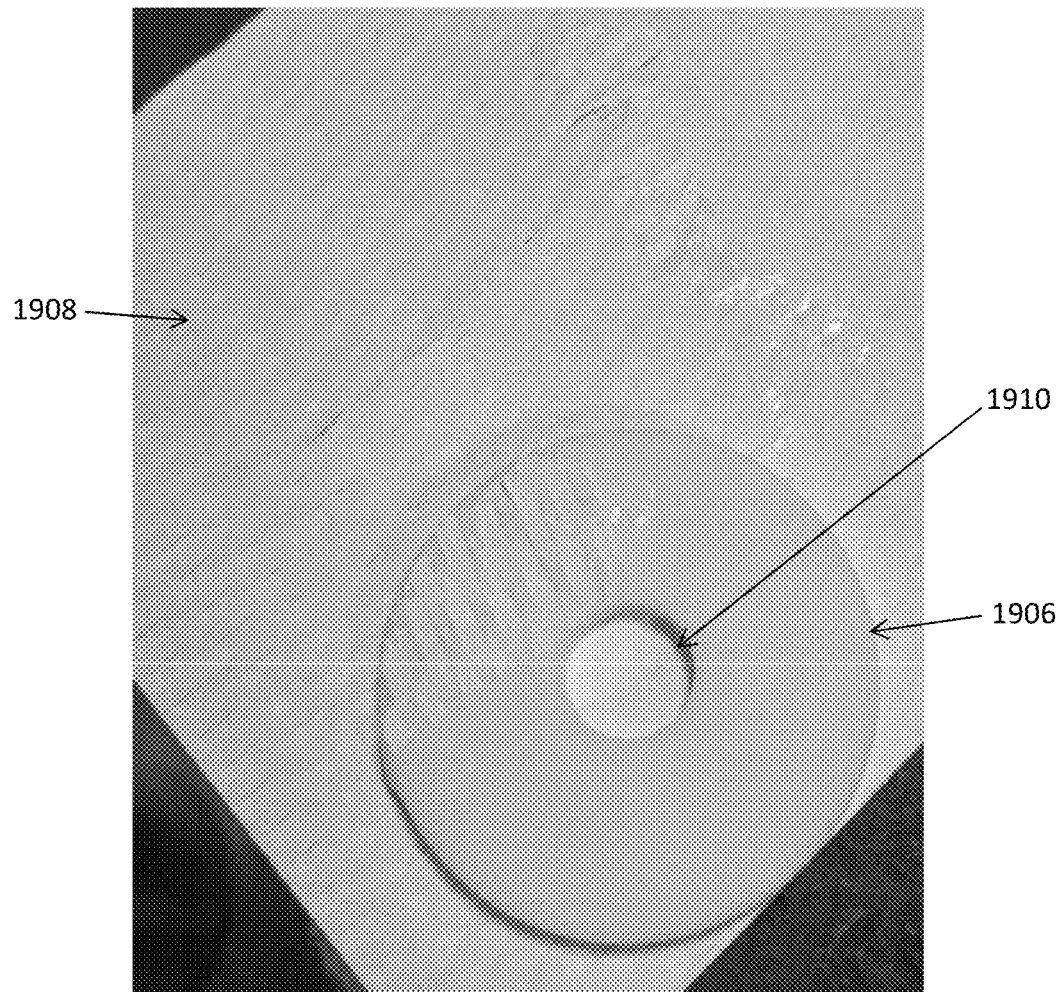
FIG. 24 is a photograph of a CMC panel joined to a dense ceramic element according to an embodiment.

FIG. 24 is a photograph of a CMC panel 1908 joined to a fully dense ceramic element according to an embodiment. In this embodiment, the fully dense ceramic element is a fully dense ceramic washer 1906. In an experiment, stress was applied to the CMC panel 1908. The bond between the CMC panel 1908 and the fully dense washer 1906 was found to be strong enough to rip the CMC material while still being bonded to the washer 1906.

Figure 25A:
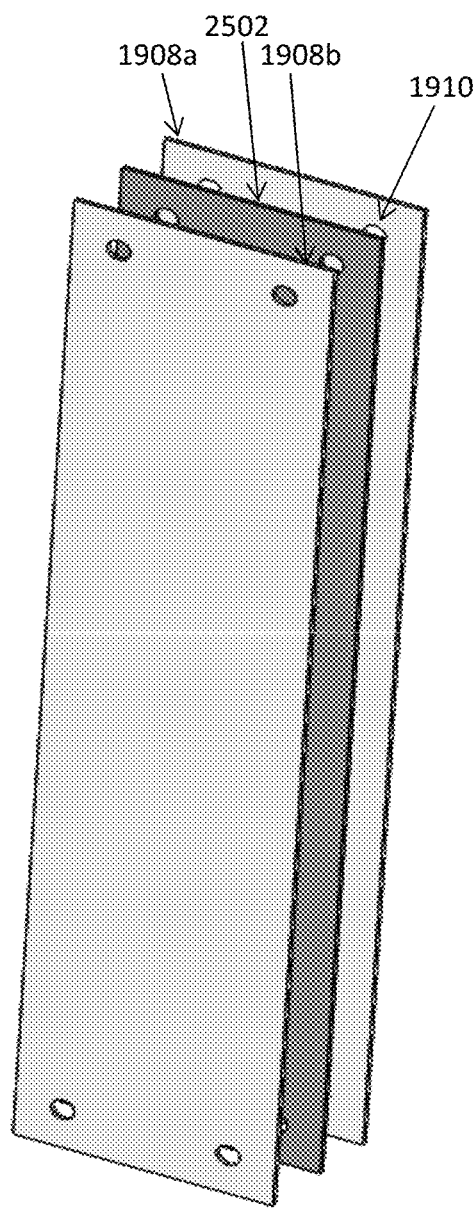
FIGS. 25A and 25B are schematic illustrations of an embodiment with two CMC panels joined to a dense ceramic element.
Figure 25B:
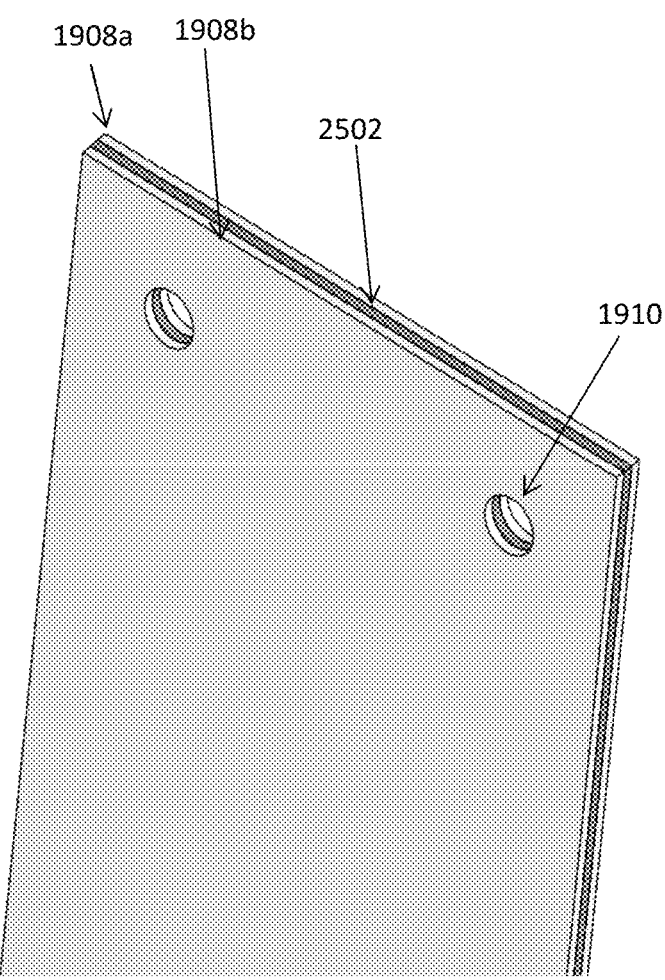
Figure 26:
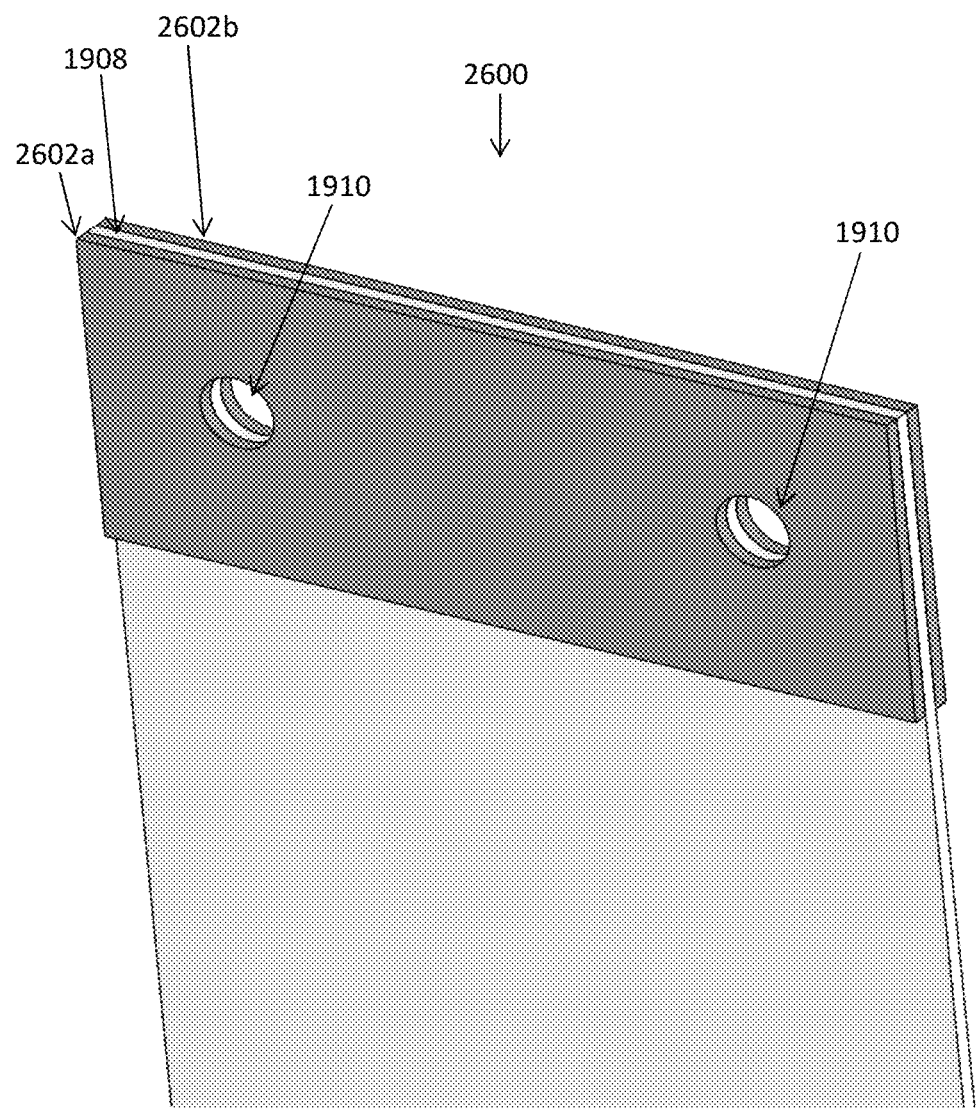
FIG. 26 is a schematic illustration of an embodiment with a CMC panel joined to two dense ceramic elements.

FIGS. 25A, 25B and 26 illustrate an embodiment in which the denser ceramic element is a denser ceramic panel, such as a fully dense ceramic panel. In the embodiment shown in FIGS. 25A and 25B, two CMC panels 1908a, 1908b are joined to the denser ceramic panel 2502, such as a fully dense ceramic panel. In this embodiment, the dense ceramic panel 2502 is located between the two CMC panels 1908a, 1908b. In an embodiment, a first glass seal (not shown) may be provided between the first CMC panel 1908a and the denser ceramic panel 2502 and a second glass seal (not shown) may be provided between the second CMC panel 1908b and the dense ceramic panel 2502. Alternatively, the elements may be attached to each other by solid state sintering or mechanical implements instead of or in addition to the glass seals.

FIG. 26 illustrates an embodiment in which a single CMC panel 1908 is joined to two denser, such as fully dense, ceramic panels 2602a, 2602b. In this embodiment, the CMC panel 1908 is located between the first and second fully dense ceramic panels 2602a, 2602b. As illustrated, the fully dense ceramic panels 2602a, 2602b are smaller in area then the CMC panel 1908. However, the fully dense ceramic panels 2602a, 2602b may extend the full length of the CMC panel 1908. In an embodiment, a first glass seal (not shown) may be provided between the first dense ceramic panel 2602a and the CMC panel 1908 and a second glass seal (not shown) may be provided between the second dense ceramic panel 2602 and the CMC panel 1908. Alternatively, the elements may be attached to each other by solid state sintering or mechanical implements instead of or in addition to the glass seals.

Any one or more features from any one or more embodiments may be used in any suitable combination with any one or more features from one or more of the other embodiments. Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A fuel cell stack assembly, comprising:
a fuel cell stack column;
an upper block disposed on a first end of the column;
a lower block disposed on an opposing second end of the column; and
side baffles disposed on opposing sides of the column and connected to the upper block and the lower block by pins which extend through holes in the side baffles into respective holes in the upper block and the lower block, the side baffles each comprising:
at least one ceramic matrix composite (CMC) panel having a hole; and
at least one denser ceramic element which has a higher density than the CMC panel, wherein the at least one denser ceramic element is joined to the CMC panel at the hole in the CMC panel;
wherein the at least one denser ceramic element comprises at least one denser ceramic panel which extends a full length of the CMC ceramic panel and has a same area as the CMC ceramic panel.

2. The assembly of claim 1, further comprising a glass seal located between the at least one CMC panel and the at least one denser ceramic element.

3. The assembly of claim 1, wherein the pins have a higher density than the CMC panels.

4. The assembly of claim 1, wherein the at least one denser ceramic panel is joined to two CMC panels.

5. The assembly of claim 1, further comprising a glass seal which is deposited inside of the hole in the CMC panel, wherein the glass seal does not extend out of the hole onto or over a major surface of the CMC panel.

6. The assembly of claim 1, wherein the at least one denser ceramic element comprises at least one fully dense ceramic element.

7. A fuel cell stack assembly, comprising:
a fuel cell stack column;
an upper block disposed on a first end of the column;
a lower block disposed on an opposing second end of the column; and
side baffles disposed on opposing sides of the column and connected to the upper block and the lower block by pins which extend through holes in the side baffles into respective holes in the upper block and the lower block, the side baffles each comprising:
at least one ceramic matrix composite (CMC) panel having a hole; and
at least one denser ceramic element which has a higher density than the CMC panel, wherein the at least one denser ceramic element is joined to the CMC panel at the hole in the CMC panel;
wherein the at least one denser ceramic element comprises two denser ceramic panels which extend the full length of the CMC ceramic panel, and which are joined to the CMC ceramic panel which is located between the two denser ceramic panels.

* * * * *